United States Patent
Xing et al.

(10) Patent No.: US 11,995,141 B2
(45) Date of Patent: May 28, 2024

(54) ADDRESS OBTAINING METHOD AND DEVICE

(71) Applicant: Huawei Technologies Co., Ltd., Shenzhen (CN)

(72) Inventors: Feng Xing, Nanjing (CN); Linfeng Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/256,879

(22) PCT Filed: Dec. 3, 2021

(86) PCT No.: PCT/CN2021/135452
§ 371 (c)(1),
(2) Date: Jun. 9, 2023

(87) PCT Pub. No.: WO2022/121803
PCT Pub. Date: Jun. 16, 2022

(65) Prior Publication Data
US 2024/0028660 A1    Jan. 25, 2024

(30) Foreign Application Priority Data
Dec. 10, 2020   (CN) .......................... 202011436244.6

(51) Int. Cl.
*G06F 15/16* (2006.01)
*G06F 16/955* (2019.01)
*H04L 67/00* (2022.01)

(52) U.S. Cl.
CPC .......... *G06F 16/9554* (2019.01); *H04L 67/34* (2013.01)

(58) Field of Classification Search
CPC ............................ H04L 67/34; G06F 16/9554
USPC ....................................................... 709/217
See application file for complete search history.

(56) References Cited

U.S. PATENT DOCUMENTS

| | | | | |
|---|---|---|---|---|
| 8,509,744 | B2* | 8/2013 | Brennan | H04W 4/60 455/418 |
| 8,863,157 | B2* | 10/2014 | Zhang | G06F 11/3093 718/1 |
| 9,697,353 | B2* | 7/2017 | Ding | G06F 21/54 |
| 9,886,256 | B2* | 2/2018 | Lazar | G06F 8/61 |
| 10,255,369 | B2* | 4/2019 | Malkin | G06Q 30/0269 |
| 11,238,119 | B2* | 2/2022 | Malkin | G06F 16/9535 |
| 11,360,658 | B2* | 6/2022 | Carter | G06F 3/0486 |
| 2011/0124319 | A1 | 5/2011 | Fu | |
| 2016/0342955 | A1* | 11/2016 | Brock | G06Q 10/1095 |
| 2017/0075670 | A1* | 3/2017 | Lazar | G06F 8/61 |
| 2018/0025086 | A1* | 1/2018 | Malkin | H04L 67/306 707/710 |
| 2019/0251129 | A1* | 8/2019 | Barbare | G06F 16/9574 |

(Continued)

*Primary Examiner* — Moustafa M Meky
(74) *Attorney, Agent, or Firm* — Slater Matsil, LLP

(57) ABSTRACT

The method includes: receiving a first message sent by a first application APP on a terminal device, where the first message includes a user agent UA; determining, based on the first message, a first address and a second address corresponding to the terminal device; and sending a second message to the first APP, where the second message includes the first address and the second address, and the second message is used by the first APP to first attempt to open a page corresponding to the first address after receiving the second message, and if the opening fails, open a page corresponding to the second address.

20 Claims, 20 Drawing Sheets

(56) References Cited

U.S. PATENT DOCUMENTS

2019/0266200 A1* 8/2019 Francolla ............ H04L 61/4511
2022/0129143 A1* 4/2022 Carter ................. G06F 3/04847

* cited by examiner

```
Default policy
         Address to be opened (high-priority)  [        ]
Android
         Address to be opened (low-priority)   [        ]

Address to be opened (high-priority)  [        ]
iOS
         Address to be opened (low-priority)   [        ]

Advanced policy ⊕

Condition ⊕ Add a condition

Operation
         Address to be opened (high-priority)  [        ]
         Address to be opened (low-priority)   [        ]
```

FIG. 5

Default policy

Android
- Address to be opened (high-priority)
- Address to be opened (low-priority)

iOS
- Address to be opened (high-priority)
- Address to be opened (low-priority)

Advanced policy ⊕

Condition ⊕    Add a condition

| Operating system ▽ | equals to ▽ | *Input* |
| Brand ▽ | equals to ▽ | *Input* |
| Country/region ▽ | includes ▽ | *Input* |

Operation
- Address to be opened (high-priority)
- Address to be opened (low-priority)

FIG. 9

//(1)
ADDRESS OBTAINING METHOD AND DEVICE

CROSS-REFERENCE TO RELATED APPLICATIONS

This application is a national stage of International Application No. PCT/CN2021/135452, filed on Dec. 3, 2021, which claims priority to Chinese Patent Application No. 202011436244.6 filed on Dec. 10, 2020. Both of the aforementioned applications are hereby incorporated by reference in their entireties.

TECHNICAL FIELD

Embodiments of this application relate to the field of terminal technologies, and in particular, to an address obtaining method and a device.

BACKGROUND

A developer may promote an application (Application, APP) by distributing the APP to different application stores. A unified two-dimensional code is generated for the APP. A user can scan the two-dimensional code using a terminal device to download the APP.

However, after scanning the two-dimensional code, the terminal device may fail to open a corresponding download page. As a result, the user cannot download the APP, resulting in poor user experience in downloading.

SUMMARY

Embodiments of this application provide an address obtaining method and a device, to improve a success rate of opening a download page by a terminal device.

According to a first aspect, an embodiment of this application provides an address obtaining method, including: receiving a first message sent by a first application APP on a terminal device, where the first message includes a user agent UA; determining, based on the first message, a first address and a second address corresponding to the terminal device; and sending a second message to the first APP, where the second message includes the first address and the second address, and the second message is used by the first APP to first attempt to open a page corresponding to the first address after receiving the second message, and if the opening fails, open a page corresponding to the second address.

In a possible implementation, the determining, based on the first message, a first address and a second address corresponding to the terminal device includes: parsing the UA to obtain an operating system of the terminal device; and searching, based on the operating system, a first policy for the first address and the second address corresponding to the terminal device, where the first policy includes first addresses and second addresses corresponding to different operating systems.

In a possible implementation, the first message further includes an IP address of the terminal device, and the determining, based on the first message, a first address and a second address corresponding to the terminal device includes: determining first information of the terminal device based on the UA and the IP address, where the first information includes at least one of the following: an operating system, a model, a brand, or a country/region; searching, based on the first information, a second policy for the first address and the second address corresponding to the terminal device, where the second policy includes first addresses and second addresses corresponding to different operating systems, brands, models, and/or countries/regions; and if the first address and the second address corresponding to the terminal device are not found in the second policy, searching, based on the operating system, a first policy for the first address and the second address corresponding to the terminal device, where the first policy includes first addresses and second addresses corresponding to different operating systems.

In a possible implementation, before the sending a second message to the first APP, the method further includes: parsing the UA to obtain the operating system of the terminal device and a type of the first APP; and constructing the second message based on the operating system of the terminal device and the type of the first APP.

In a possible implementation, the constructing the second message based on the operating system of the terminal device and the type of the first APP includes: if the operating system of the terminal device is an Android system, the type of the first APP belongs to a first set, and the second address corresponding to the terminal device is a hypertext transfer protocol http address, constructing the second message conforming to an Intent syntax, where the first set includes an APP that supports the intent syntax; if the operating system of the terminal device is an Android system, the type of the first APP belongs to the first set, and the second address corresponding to the terminal device is not an http address, constructing the second message of JAVASCRIPT; or if the operating system of the terminal device is an Android system, and the type of the first APP belongs to a second set, constructing the second message of JAVASCRIPT, where the second set includes an APP that supports JAVASCRIPT.

In a possible implementation, the constructing the second message based on the operating system of the terminal device and the type of the first APP includes: if the operating system of the terminal device is iOS, and the type of the first APP belongs to a third set, constructing the second message of JAVASCRIPT, where the third set includes an APP that supports JAVASCRIPT.

In a possible implementation, the determining first information of the terminal device based on the UA and the IP address includes: searching, based on the UA, a cached mapping relationship for an operating system and a model corresponding to the UA; if the operating system and the model corresponding to the UA are found, determining the first information based on the IP address and the found operating system and model; if the operating system and the model corresponding to the UA are not found, parsing the UA to obtain an operating system and a model of the terminal device; and determining the first information based on the IP address, the operating system, and the model.

In a possible implementation, the first policy includes a first address and a second address corresponding to an Android system, the first address corresponding to the Android system is an address of a download page in an overseas version of Huawei application store AppGallery, and the second address corresponding to the Android system is an address of a download page in Google application store Google Play.

In a possible implementation, the second policy includes a first address and a second address corresponding to an Android system, Huawei brand, and a non-China region, the first address corresponding to the Android system, Huawei brand, and the non-China region is an address of a download page in an overseas version of Huawei application store AppGallery, and the second address corresponding to the Android system, Huawei brand, and the non-China region is an address of a download page in Google application store Google Play.

In a possible implementation, the searching, based on the operating system, a first policy for the first address and the second address corresponding to the terminal device includes: if the operating system is the Android system, using the address of the download page in AppGallery in the first policy as the first address corresponding to the terminal device, and using the address of the download page in Google Play in the first policy as the second address corresponding to the terminal device.

In a possible implementation, the searching, based on the first information, a second policy for the first address and the second address corresponding to the terminal device includes: if the operating system of the terminal device is the Android system, the brand of the terminal device is Huawei, and the country/region of the terminal device is a non-China region, using the address of the download page in AppGallery in the second policy as the first address corresponding to the terminal device, and using the address of the download page in Google Play in the second policy as the second address corresponding to the terminal device.

According to a second aspect, an embodiment of this application provides an address obtaining method, including: scanning an identification code to obtain a third address; sending a first message to an electronic device corresponding to the third address, where the first message includes a user agent UA; receiving a second message sent by the electronic device, where the second message includes a first address and a second address corresponding to a terminal device, and the first address and the second address are determined by the electronic device based on the first message; and attempting to open a page corresponding to the first address, and if the opening fails, opening a page corresponding to the second address.

In a possible implementation, the identification code is a two-dimensional code.

In a possible implementation, the first address and the second address are found in a first policy by the electronic device based on an operating system of the terminal device after parsing the UA to obtain the operating system; and the first policy includes first addresses and second addresses corresponding to different operating systems.

In a possible implementation, the first message further includes an IP address of the terminal device, and the first address and the second address are found in a second policy by the electronic device based on first information of the terminal device after determining the first information based on the UA and the IP address; the second policy includes first addresses and second addresses corresponding to different operating systems, brands, models, and/or countries/regions; and the first information includes at least one of the following: an operating system, a model, a brand, or a country/region.

In a possible implementation, the first message further includes an IP address of the terminal device, and the first address and the second address are found in a first policy by the electronic device when failing to find the first address and the second address in a second policy based on first information of the terminal device after determining the first information based on the UA and the IP address; the second policy includes first addresses and second addresses corresponding to different operating systems, brands, models, and/or countries/regions; and the first policy includes first addresses and second addresses corresponding to different operating systems; and the first information includes at least one of the following: an operating system, a model, a brand, or a country/region.

According to a third aspect, an embodiment of this application provides an electronic device, including a policy matching module and a policy execution module, where the policy matching module is configured to receive a first message sent by a first application APP on a terminal device, where the first message includes a user agent UA, and is further configured to determine, based on the first message, a first address and a second address corresponding to the terminal device; and the policy execution module is configured to send a second message to the first APP, where the second message includes the first address and the second address, and the second message is used by the first APP to first attempt to open a page corresponding to the first address after receiving the second message, and if the opening fails, open a page corresponding to the second address.

In a possible implementation, the electronic device further includes: a policy configuration module, where the policy configuration module includes a console and a policy management module, where the console is configured to configure a first policy, the policy management module is configured to store the first policy, and the first policy includes first addresses and second addresses corresponding to different operating systems; the policy matching module is specifically configured to parse the UA to obtain an operating system of the terminal device; and the policy management module is configured to search, based on the operating system, the first policy for the first address and the second address corresponding to the terminal device.

In a possible implementation, the first message further includes an IP address of the terminal device, and the electronic device further includes a policy configuration module, where the policy configuration module includes a console, a policy management module, and an auxiliary library management module, where the auxiliary library management module is configured to store a model library and an IP mapping library, the console is configured to configure a first policy and a second policy, the policy management module is further configured to store the first policy and the second policy, the first policy includes first addresses and second addresses corresponding to different operating systems, and the second policy includes first addresses and second addresses corresponding to different operating systems, brands, models, and/or countries/regions; the policy matching module is further configured to determine an operating system and a model of the terminal device based on the UA; the auxiliary library management module is configured to determine first information of the terminal device based on the IP address, the operating system, the model, the model library, and the IP mapping library, where the first information includes at least one of the following: an operating system, a model, a brand, or a country/region; and the policy management module is further configured to search, based on the first information, the second policy for the first address and the second address corresponding to the terminal device; and if the first address and the second address corresponding to the terminal device are not found in the second policy, search, based on the operating system, the first policy for the first address and the second address corresponding to the terminal device.

In a possible implementation, the policy execution module is further configured to: parse the UA to obtain the operating system of the terminal device and a type of the first APP; and construct the second message based on the operating system of the terminal device and the type of the first APP.

In a possible implementation, the policy execution module is specifically configured to: if the operating system of the terminal device is an Android system, the type of the first APP belongs to a first set, and the second address corresponding to the terminal device is a hypertext transfer protocol http address, construct the second message conforming to an Intent syntax, where the first set includes an APP that supports the intent syntax; if the operating system of the terminal device is an Android system, the type of the first APP belongs to the first set, and the second address corresponding to the terminal device is not an http address, construct the second message of JAVASCRIPT; or if the operating system of the terminal device is an Android system, and the type of the first APP belongs to a second set, construct the second message of JAVASCRIPT, where the second set includes an APP that supports JAVASCRIPT.

In a possible implementation, the policy execution module is specifically configured to: if the operating system of the terminal device is iOS, and the type of the first APP belongs to a third set, construct the second message of JAVASCRIPT, where the third set includes an APP that supports JAVASCRIPT.

In a possible implementation, the policy matching module is specifically configured to search, based on the UA, a cached mapping relationship for an operating system and a model corresponding to the UA; if the operating system and the model corresponding to the UA are found, the auxiliary library management module is specifically configured to determine the first information based on the IP address and the found operating system and model; and if the operating system and the model corresponding to the UA are not found, the policy matching module parses the UA to obtain the operating system and the model of the terminal device, and the auxiliary library management module is specifically configured to determine the first information based on the IP address, the operating system, and the model.

In a possible implementation, the first policy includes a first address and a second address corresponding to an Android system, the first address corresponding to the Android system is an address of a download page in an overseas version of Huawei application store AppGallery, and the second address corresponding to the Android system is an address of a download page in Google application store Google Play.

In a possible implementation, the second policy includes a first address and a second address corresponding to an Android system, Huawei brand, and a non-China region, the first address corresponding to the Android system, Huawei brand, and the non-China region is an address of a download page in an overseas version of Huawei application store AppGallery, and the second address corresponding to the Android system, Huawei brand, and the non-China region is an address of a download page in Google application store Google Play.

In a possible implementation, the policy management module is specifically configured to: if the operating system is the Android system, use the address of the download page in AppGallery in the first policy as the first address corresponding to the terminal device, and use the address of the download page in Google Play in the first policy as the second address corresponding to the terminal device.

In a possible implementation, the policy management module is specifically configured to: if the operating system of the terminal device is the Android system, the brand of the terminal device is Huawei, and the country/region of the terminal device is a non-China region, use the address of the download page in AppGallery in the second policy as the first address corresponding to the terminal device, and use the address of the download page in Google Play in the second policy as the second address corresponding to the terminal device.

According to a fourth aspect, an embodiment of this application provides an electronic device, including a memory and a processor, where the processor is configured to be coupled to the memory, and read and execute instructions in the memory, to enable the electronic device to implement the method provided in the first aspect.

According to a fifth aspect, an embodiment of this application provides a terminal device, including a memory and a processor, where the processor is configured to be coupled to the memory, and read and execute instructions in the memory, to enable the terminal device to implement the method provided in the second aspect.

According to a fifth aspect, an embodiment of this application provides a communication system, including the electronic device provided in the fourth aspect and the terminal device provided in the fifth aspect.

According to a sixth aspect, an embodiment of this application provides a readable storage medium, where the readable storage medium stores a computer program; and when the computer program is executed, the method provided in the first aspect or the method provided in the second aspect is implemented.

According to the address obtaining method and the device provided in embodiments of this application, when configuring a default policy and an advanced policy, a developer may configure at least two addresses, so that a terminal device can receive the at least two addresses after scanning a two-dimensional code. The terminal device first attempts to open a page corresponding to a high-priority address, and if the opening fails, opens a page corresponding to a low-priority address. Compared with a manner of configuring only one address, this method improves a success rate of opening a download page of a target APP by the terminal device. In addition, the design of the advanced policy enables the developer to perform more refined configuration. Because a terminal device of a specific operating system, brand, model, and/or country/region supports installation of a small number of types of application stores, the developer may configure, by using the advanced policy, an address of a download page of the target APP in an application store that is most likely to be installed on the terminal device as the high-priority address, thereby further improving the success rate of opening the download page of the target APP by the terminal device. In addition, a server constructs different second messages based on an operating system of the terminal device and a type of an APP used by the terminal device to scan the two-dimensional code, so that the second message better matches the terminal device, thereby further improving the success rate of opening the download page of the target APP by the terminal device.

BRIEF DESCRIPTION OF THE DRAWINGS

FIG. 5 is a first schematic diagram of a configuration page according to an embodiment of this application;

FIG. 9 is a fifth schematic diagram of a configuration page according to an embodiment of this application;

FIG. 10A-1 and FIG. 10A-2 are a schematic flowchart of an embodiment according to embodiments of this application;

FIG. 10C-1 and FIG. 10C-2 are a schematic flowchart of another embodiment according to embodiments of this application;

DETAILED DESCRIPTION OF ILLUSTRATIVE EMBODIMENTS

After developing a new APP or updating an APP version, a developer needs to promote the new APP or the updated APP version. For ease of description, an APP that needs to be promoted is referred to as a target APP below. A developer may promote a target APP in the following manner. The developer distributes the target APP to different application stores. A unified two-dimensional code is generated for the target APP. When needing to download the target APP, a user scans the two-dimensional code by using a terminal device, so that the terminal device can open a download page of the target APP in an application store. The user can click a download button on the download page to trigger downloading of the target APP. Before opening the download page, the terminal device needs to obtain an address of the download page. The following describes several possible implementations.

Figure 1:
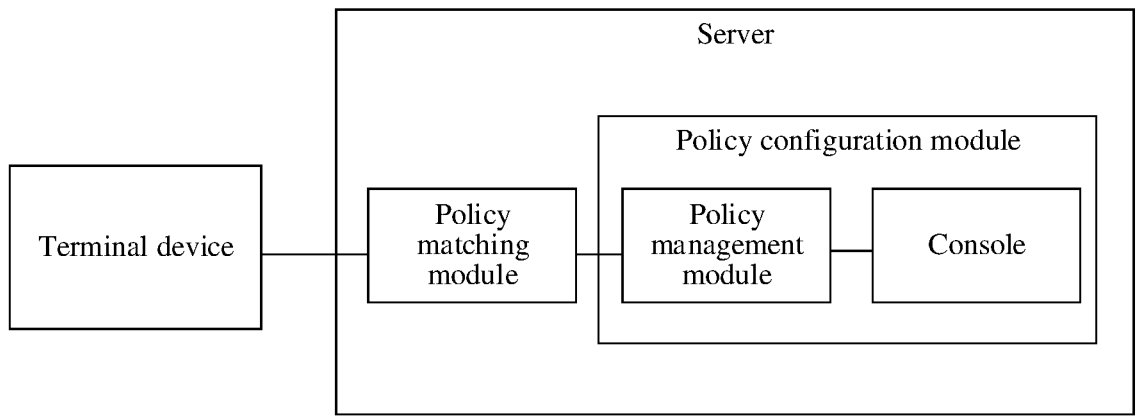
FIG. 1 is a first architectural diagram of a system according to an embodiment of this application.

In a possible implementation, the address of the download page may be obtained by using a system shown in FIG. 1. The system shown in FIG. 1 includes a terminal device and a server. The server includes a policy configuration module and a policy matching module. The policy configuration module includes a console and a policy management module. The console is configured to provide a configuration page. The developer configures different addresses for different operating systems by using the configuration page, so as to obtain a one-to-one correspondence between operating systems and addresses. Table 1 shows an example of the correspondence. In Table 1, an address corresponding to an Android system is an address of a download page of the target APP in Google application store (Google Play), and an address corresponding to an iOS system is an address of a download page of the target APP in Apple application store (App Store). The policy management module is configured to store the correspondence.

TABLE 1

| Operating system | Address to be opened |
| --- | --- |
| Android system | Address of a download page of a target APP in Google Play |
| iOS system | Address of a download page of a target APP in App Store |
| . . . | . . . |

After scanning the two-dimensional code, the terminal device sends a code scanning request to the policy matching module. The code scanning request carries a user agent (User Agent, UA). The policy matching module determines an operating system of the terminal device based on the UA, and sends the operating system of the terminal device to the policy management module. The policy management module searches the stored correspondence for an address corresponding to the operating system of the terminal device, and returns the address to the policy matching module. The policy matching module then returns the address to the terminal device. After receiving the address, the terminal device opens a page corresponding to the address.

However, the terminal device may not have installed an application store corresponding to the address returned by the policy matching module. In this case, after the terminal device receives the address returned by the policy matching module, the terminal device cannot open the page corresponding to the address. As a result, the user cannot download the target APP, affecting user experience in downloading.

An example is given below.

It is assumed that the operating system of the terminal device is the Android system, and the installed application store is an overseas version of Huawei application store AppGallery. It is assumed that the address configured by the developer for the Android system by using the configuration page is the address of the download page of the target APP in Google Play. In this case, after receiving the code scanning request from the terminal device, the policy matching module returns the address of the download page of the target APP in Google Play to the terminal device. However, because Google Play is not installed on the terminal device, the terminal device cannot open the page corresponding to the address. As a result, the user cannot download the target APP, affecting user experience in downloading.

To resolve the foregoing problem, an embodiment of this application provides another possible implementation, in which the developer may configure a default policy by using the console. In the default policy, different operating systems may each correspond to at least two addresses, and priorities of the at least two addresses are different. For ease of description, in embodiments of this application, an example in which different operating systems each correspond to two addresses is used to describe solutions of embodiments of this application. In embodiments of this application, the two addresses are referred to as a high-priority address and a low-priority address. After the terminal device scans the two-dimensional code, the server may match the operating system of the terminal device with the default policy to obtain the high-priority address and the low-priority address corresponding to the operating system of the terminal device, and send the two addresses to the terminal device. The terminal device first attempts to open a page corresponding to the high-priority address. If the opening fails, the terminal device opens a page corresponding to the low-priority address. Compared with a manner of configuring only one address, this method improves a success rate of opening the download page of the target APP by the terminal device.

Optionally, the developer may further configure an advanced policy by using the console. During the configuration of the advanced policy, at least two addresses may be configured for different operating systems, brands, models, and/or countries/regions, and priorities of the at least two addresses are different. For ease of description, in embodiments of this application, an example in which different operating systems, brands, models, and/or countries/regions each include two addresses is used to describe solutions of embodiments of this application. In embodiments of this application, the two addresses are referred to as a high-priority address and a low-priority address. After the terminal device scans the two-dimensional code, the server may preferentially use the advanced policy to perform matching on the terminal device, and if the matching fails, use the default policy to perform matching on the terminal device. Because a terminal device of a specific operating system, brand, model, and/or country/region supports installation of a small number of types of application stores, the developer may configure, by using the advanced policy, an address of a download page of the target APP in an application store that is most likely to be installed on the terminal device as the high-priority address, thereby further improving the success rate of opening the download page of the target APP by the terminal device.

It should be noted that the developer may configure only the default policy, or configure only the advanced policy, or configure both the default policy and the advanced policy. This is not limited in embodiments of this application. The default policy is also referred to as a first policy in embodiments of this application, and the advanced policy is also referred to as a second policy in embodiments of this application. The high-priority address is also referred to as a first address in embodiments of this application, and the low-priority address is also referred to as a second address in embodiments of this application.

Figure 2:
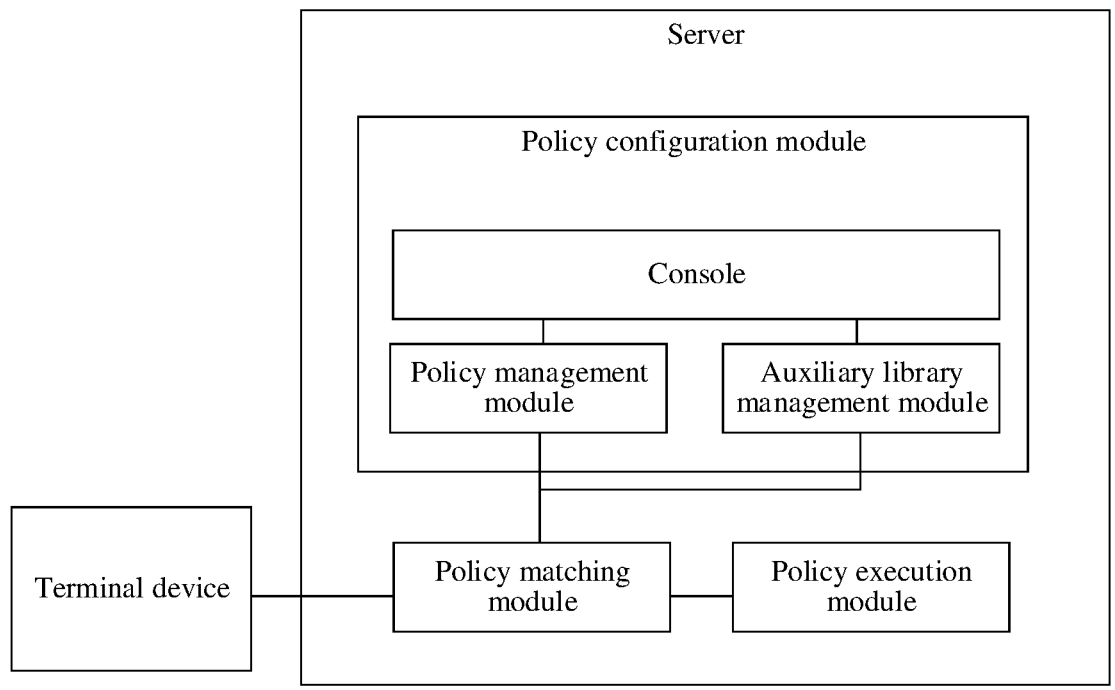
FIG. 2 is a second architectural diagram of a system according to an embodiment of this application.

FIG. 2 is an architectural diagram of a system according to the foregoing implementation. The system shown in FIG. 2 includes a terminal device and a server. A form of the terminal device includes but is not limited to a mobile phone, a tablet computer, or a notebook computer. The server includes but is not limited to a policy configuration module, a policy matching module, and a policy execution module. The policy configuration module includes but is not limited to an auxiliary library management module, a console, and a policy management module. The server is also referred to as a first device or an electronic device in embodiments of this application. Functions of the modules are described one by one below.

The following describes the functions of the auxiliary library management module.

Figure 3:
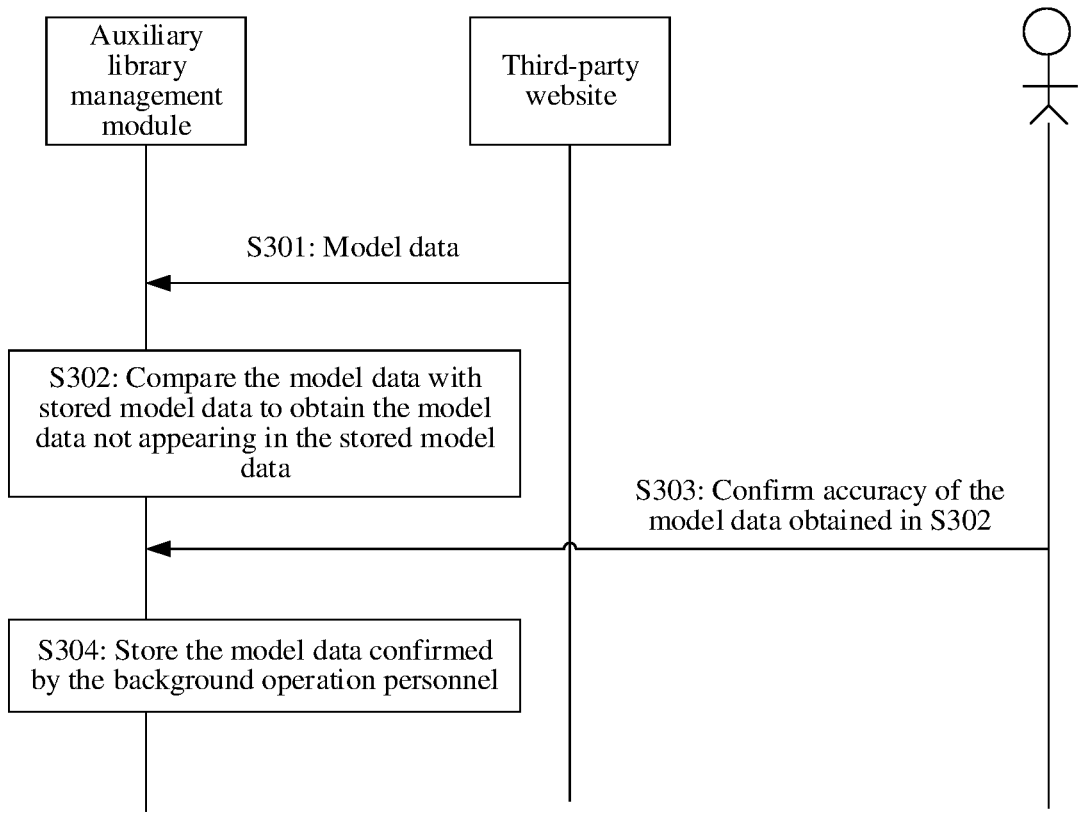
FIG. 3 is a schematic flowchart of updating a model library according to an embodiment of this application.

The auxiliary library management module stores a model library and an IP mapping library. The model library includes multiple pieces of model data, and each piece of model data includes but is not limited to an operating system, a brand, or a model of the terminal device. The model library may be updated by using a method shown in FIG. 3, which specifically includes the following steps.

S301: The auxiliary library management module obtains model data from a third-party website.

In a possible implementation, the auxiliary library management module may periodically obtain the model data from the third-party website in a crawler manner, and the third-party website may be a third-party model library website.

S302: The auxiliary library management module compares the obtained model data with stored model data to obtain the model data not appearing in the stored model data.

S303: Background operation personnel confirm accuracy of the model data obtained in S302.

In a possible implementation, the background operation personnel may retain correct model data in the model data obtained in S302, may correct incorrect model data in the model data obtained in S302, and may add new model data.

S304: The auxiliary library management module stores the model data confirmed by the background operation personnel.

The above steps S301 to S304 are a process for updating the model library.

Figure 4:
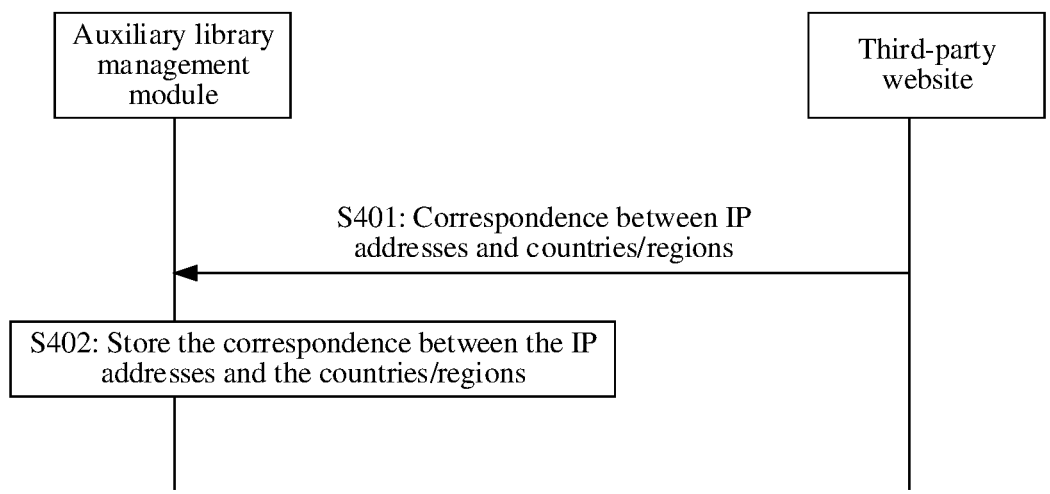
FIG. 4 is a schematic flowchart of updating an IP mapping library according to an embodiment of this application.

The IP mapping library is used to indicate a correspondence between IP addresses and countries/regions, and the IP mapping library may be updated by using a method shown in FIG. 4, which specifically includes the following steps.

S401: The auxiliary library management module obtains the correspondence between the IP addresses and the countries/regions from a third-party website.

In a possible implementation, the auxiliary library management module may periodically obtain the correspondence between the IP addresses and the countries/regions from the third-party website in a crawler manner. The third-party website may be a GeoIP2 website.

S402: The auxiliary library management module stores the obtained correspondence.

The above steps S401 to S402 are a process for updating the IP mapping library.

The following describes the functions of the console.

The console is configured to provide a configuration page. The developer may configure a default policy by using the configuration page. Optionally, the developer may further configure an advanced policy by using the configuration page. The default policy includes high-priority addresses and low-priority addresses corresponding to different operating systems, and the advanced policy includes high-priority addresses and low-priority addresses corresponding to different operating systems, brands, models, and/or countries/regions.

The following describes processes for configuring the default policy and the advanced policy.

For example, the configuration page may be designed in a form shown in FIG. 5. The default policy in FIG. 5 includes two operating systems: an Android system and an iOS system. The developer may configure a high-priority address corresponding to the Android system in a high-priority address input box corresponding to the Android system, and configure a low-priority address corresponding to the Android system in a low-priority address input box corresponding to the Android system; and configure a high-priority address corresponding to the iOS system in a high-priority address input box corresponding to the iOS system, and configure a low-priority address corresponding to the iOS system in a low-priority address input box corresponding to the iOS system. The policy management module is configured to store the default policy. Table 2 shows an example of the default policy stored in the policy management module. It should be noted that in Table 2, an example in which each operating system includes two addresses is used for illustration. The developer may alternatively configure at least two addresses for each operating system. The at least two addresses have different priorities. Table 2 constitutes no limitation on embodiments of this application.

TABLE 2

| Operating system | High-priority address | Low-priority address |
| --- | --- | --- |
| Android system | Address of a download page of a target APP in AppGallery | Address of a download page of a target APP in Google Play |
| iOS system | Address of a download page of a target APP in App Store | None |
| ... | ... | ... |

It should be noted that the default policy may further include other operating systems. Table 2 is merely an example, and constitutes no limitation on embodiments of this application.

Figure 6:
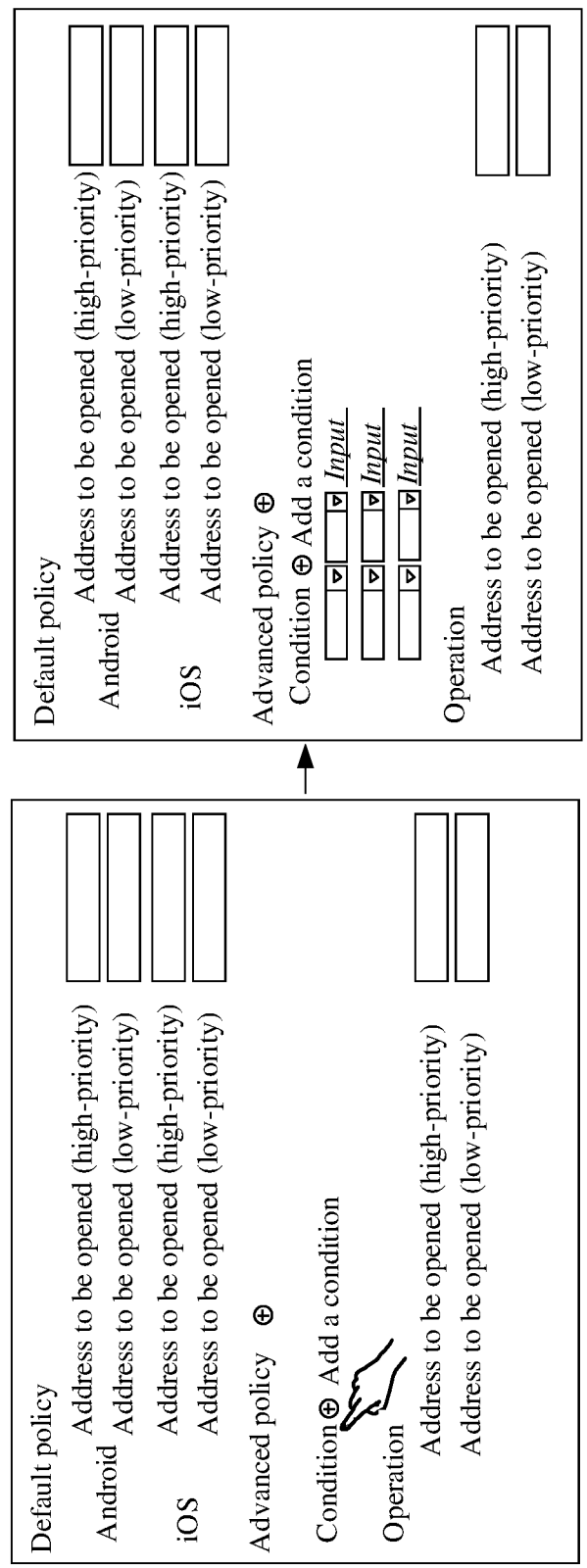
FIG. 6 is a second schematic diagram of a configuration page according to an embodiment of this application.
Figure 7:
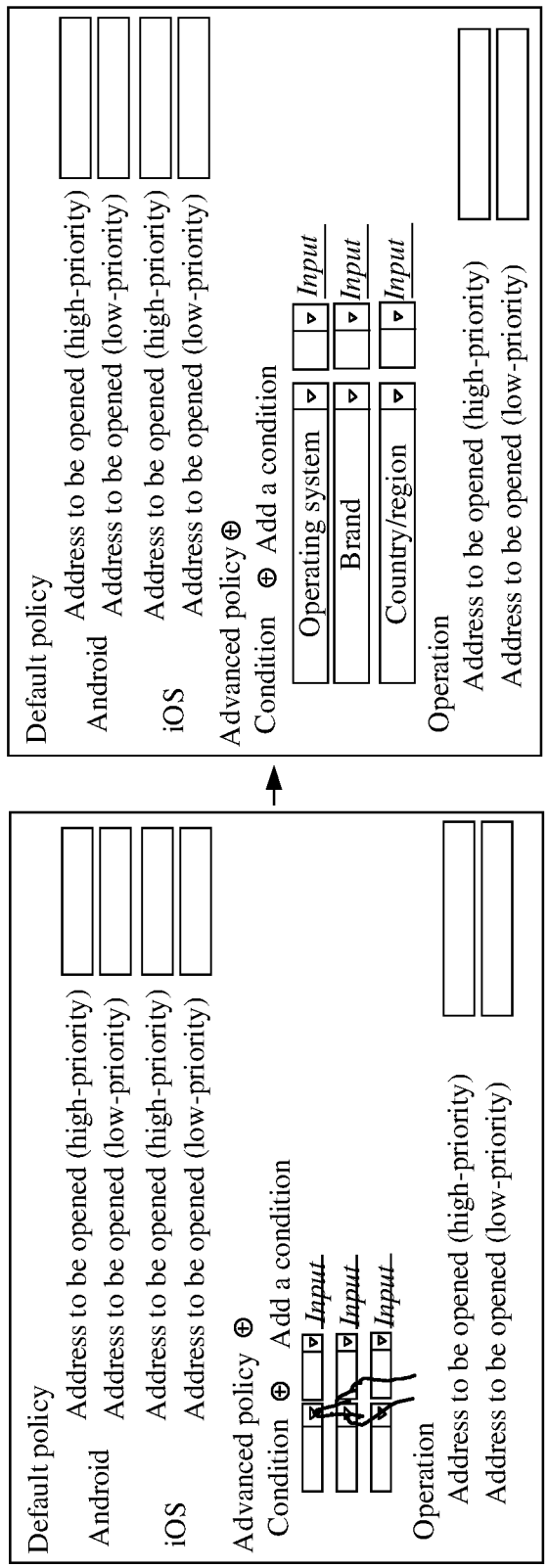
FIG. 7 is a third schematic diagram of a configuration page according to an embodiment of this application.
Figure 8:
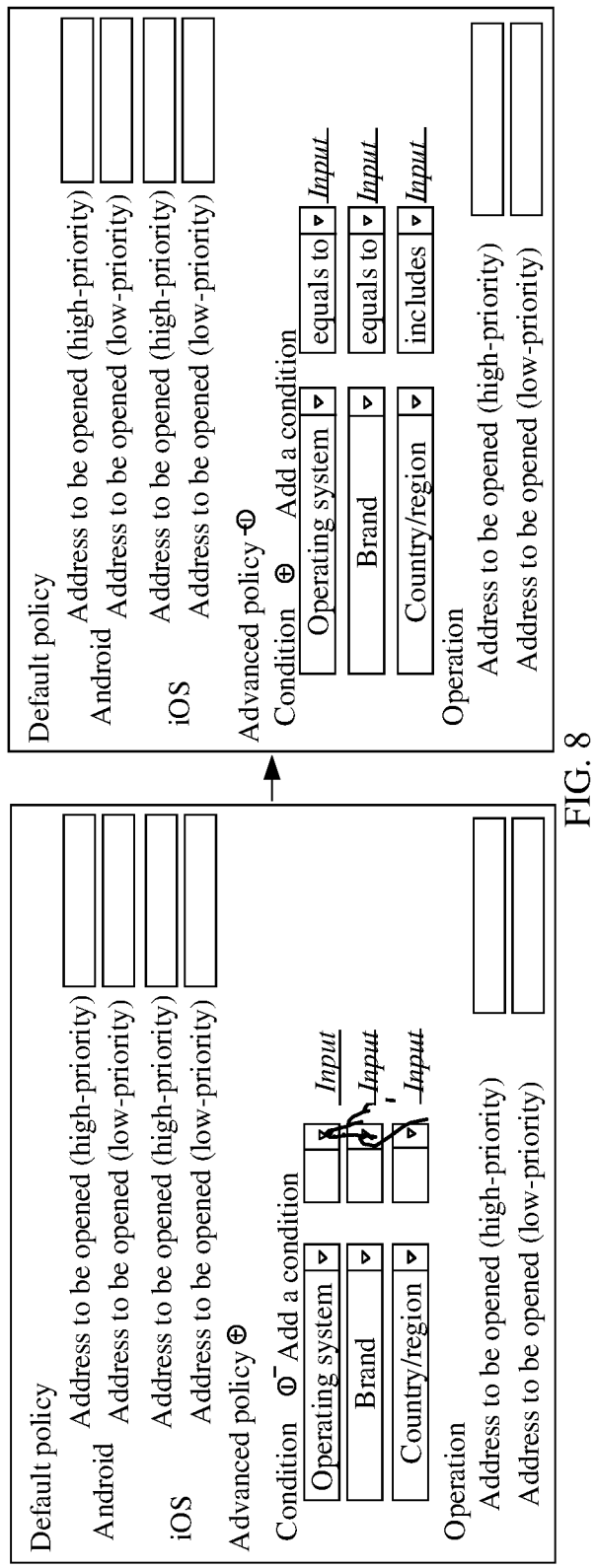
FIG. 8 is a fourth schematic diagram of a configuration page according to an embodiment of this application.

As shown in FIG. 6, when configuring the advanced policy, the developer first configures a condition in the advanced policy, and then configures a high-priority address and a low-priority address under the corresponding condition. During the configuration of the condition in the advanced policy, a number of conditions may be added by using a button shown in FIG. 6. In FIG. 6, adding three conditions is used as an example. Condition types may be selected by using buttons shown in FIG. 7. In FIG. 7, as an example, the selected condition types include operating system, brand, and country/region. A relationship between a specific value and a condition type may be selected by using a button shown in FIG. 8. In FIG. 8, as an example, a relationship between operating system and a specific value is "equals to", a relationship between brand and a specific value is "equals to", and a relationship between country/region and a specific value is "includes". A specific value may be entered at an "Input" position corresponding to each condition type. For example, Android system is entered in the "Input" position corresponding to operating system, Huawei is entered in the "Input" position corresponding to brand, and China and USA is entered in the "Input" position corresponding to country/region. Through the above configuration process, a group of conditions may be obtained. The group of conditions are as follows: Android system, Huawei, China/USA It should be noted that in FIG. 7, the selected condition types including operating system, brand, and country/region are merely used as an example, and a condition type "model" may be further selected. FIG. 7 constitutes no limitation on embodiments of this application. After configuring a condition in the advanced policy, the developer may configure a high-priority address corresponding to the condition in a high-priority address input box corresponding to an operation entry, and configure a low-priority address corresponding to the condition in a low-priority address input box corresponding to the operation entry. In this way, a group of advanced policies may be obtained. The developer may increase the number of advanced policies by using a button shown in FIG. 9, and each advanced policy may be configured in the foregoing manner. The policy management module is configured to store the advanced policy. Table 3 shows an example of the advanced policy stored in the policy management module. It should be noted that in Table 3, an example in which each condition includes two addresses is used for illustration. The developer may alternatively configure at least two addresses for each condition, and the at least two addresses have different priorities. Table 3 constitutes no limitation on embodiments of this application. In addition, USA region in Table 3 may be replaced with another non-China region. USA region in Table 3 is merely an example, and constitutes no limitation on embodiments of this application.

TABLE 3

| | Condition | High-priority address | Low-priority address |
| --- | --- | --- | --- |
| Advanced policy 1 | Android system, Huawei, USA region | Address of a download page of a target APP in AppGallery | Address of a download page of a target APP in Google Play |
| Advanced policy 2 | Android system, Huawei, ELE-AL00, USA region | Address of a download page of a target APP in AppGallery | Address of a download page of a target APP in Google Play |
| Advanced policy 3 | iOS system, Apple, A2223, USA region | Address of a download page of a target APP in App Store | None |
| ... | ... | ... | ... |

The following describes the functions of the policy matching module.

The functions of the policy matching module are described below through difference cases.

In a first case, the developer configures only the default policy.

The policy matching module is configured to receive a first message sent by the terminal device, where the first message carries a UA. The policy matching module determines the operating system of the terminal device based on the UA, and sends the operating system of the terminal device to the policy management module. The policy management module searches, based on the operating system of the terminal device, the default policy for a corresponding high-priority address and low-priority address, and returns the found high-priority address and low-priority address to the policy matching module. The policy matching module sends, to the policy execution module, the two addresses returned by the policy management module.

In a second case, the developer configures only the advanced policy.

The policy matching module is configured to receive a first message sent by the terminal device, where the first message carries an IP address of the terminal device and a user agent (User Agent, UA). The policy matching module determines the operating system and the model of the terminal device based on the UA, and then obtains the address of the download page in the following manner.

The policy matching module sends the IP address of the terminal device to the auxiliary library management module. The auxiliary library management module searches, based on the IP address of the terminal device, the IP mapping library for the country/region corresponding to the terminal device, and returns the country/region corresponding to the terminal device to the policy matching module.

The policy matching module also sends the operating system and the model of the terminal device to the auxiliary library management module. The auxiliary library management module searches, based on the operating system and the model of the terminal device, the model library for the brand of the terminal device, and returns the brand of the terminal device to the policy matching module.

The policy matching module sends the country/region corresponding to the terminal device and the operating system, the model, and the brand of the terminal device to the policy management module. The policy management module searches the advanced policy for the high-priority address and the low-priority address based on the country/region corresponding to the terminal device and the operating system, the model, and the brand of the terminal device, and returns the found high-priority address and low-priority address to the policy matching module. The policy matching module sends, to the policy execution module, the two addresses returned by the policy management module.

In a third case, the developer configures both the default policy and the advanced policy.

The policy matching module is configured to receive a first message sent by the terminal device, where the first message carries an IP address of the terminal device and a user agent (User Agent, UA). The policy matching module determines the operating system and the model of the terminal device based on the UA, and then obtains the address of the download page in the following manner.

The policy matching module sends the IP address of the terminal device to the auxiliary library management module. The auxiliary library management module searches, based on the IP address of the terminal device, the IP mapping library for the country/region corresponding to the terminal device, and returns the country/region corresponding to the terminal device to the policy matching module.

The policy matching module also sends the operating system and the model of the terminal device to the auxiliary library management module. The auxiliary library management module searches, based on the operating system and the model of the terminal device, the model library for the brand of the terminal device, and returns the brand of the terminal device to the policy matching module.

The policy matching module sends the country/region corresponding to the terminal device and the operating system, the model, and the brand of the terminal device to the policy management module. The policy management module searches the advanced policy for the high-priority address and the low-priority address based on the country/region corresponding to the terminal device and the operating system, the model, and the brand of the terminal device. If the high-priority address and the low-priority address are found, the policy management module returns the found high-priority address and low-priority address to the policy matching module. If the high-priority address and the low-priority address are not found, the policy management module searches the default policy for the corresponding high-priority address and low-priority address, and returns the found high-priority address and low-priority address to the policy matching module. The policy matching module sends, to the policy execution module, the two addresses returned by the policy management module.

The following describes the functions of the policy execution module.

The policy execution module is configured to construct a second message based on the operating system of the terminal device and a type of an APP used by the terminal device during code scanning, where the second message includes the high-priority address and the low-priority address sent by the policy matching module. After receiving the second message, the terminal device first attempts to open a page corresponding to the high-priority address, and if the opening fails, opens a page corresponding to the low-priority address. Compared with a manner of configuring only one address, this improves a success rate of opening a download page of the target APP by the terminal device.

Figures 1, 10A:
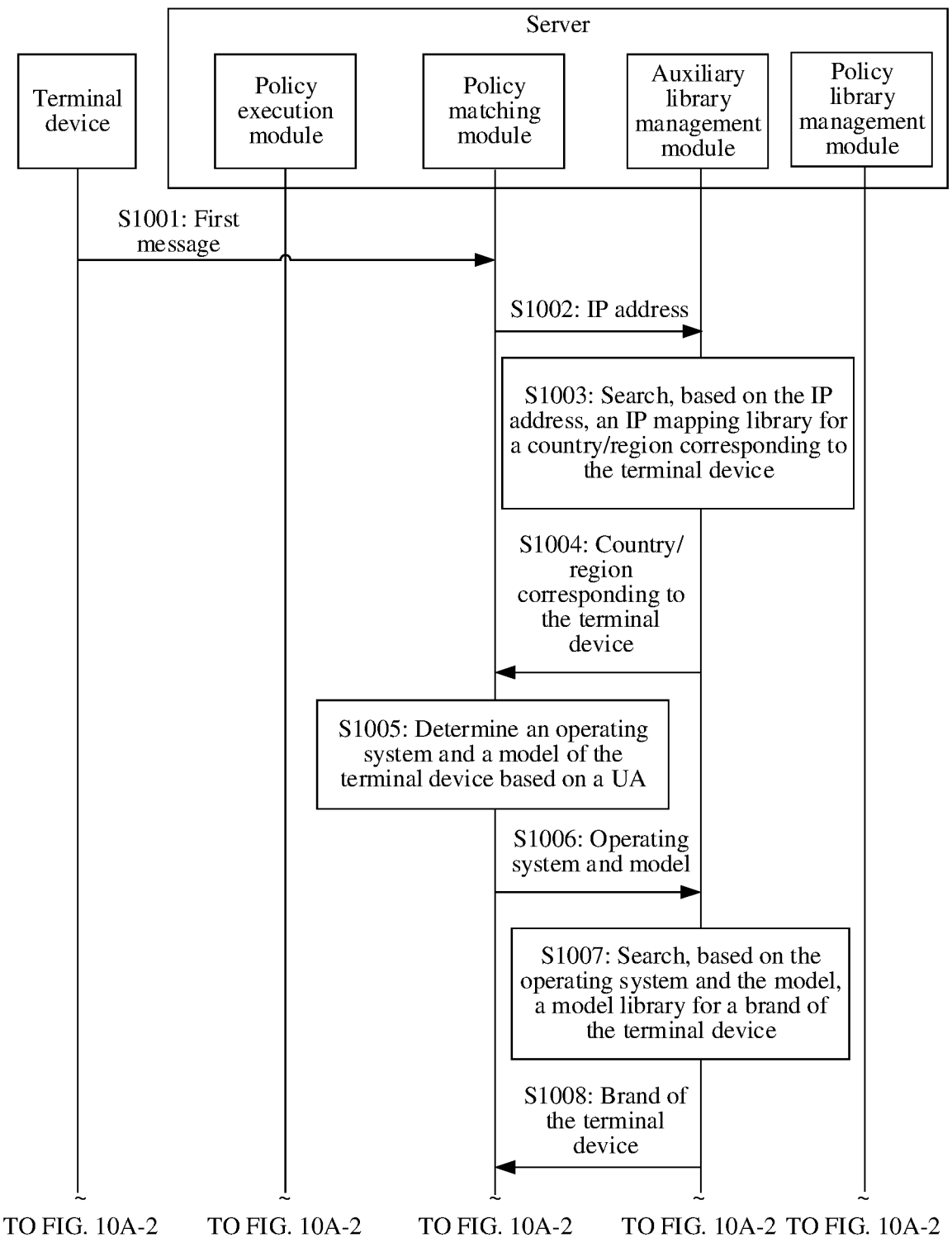
Figures 2, 10A:
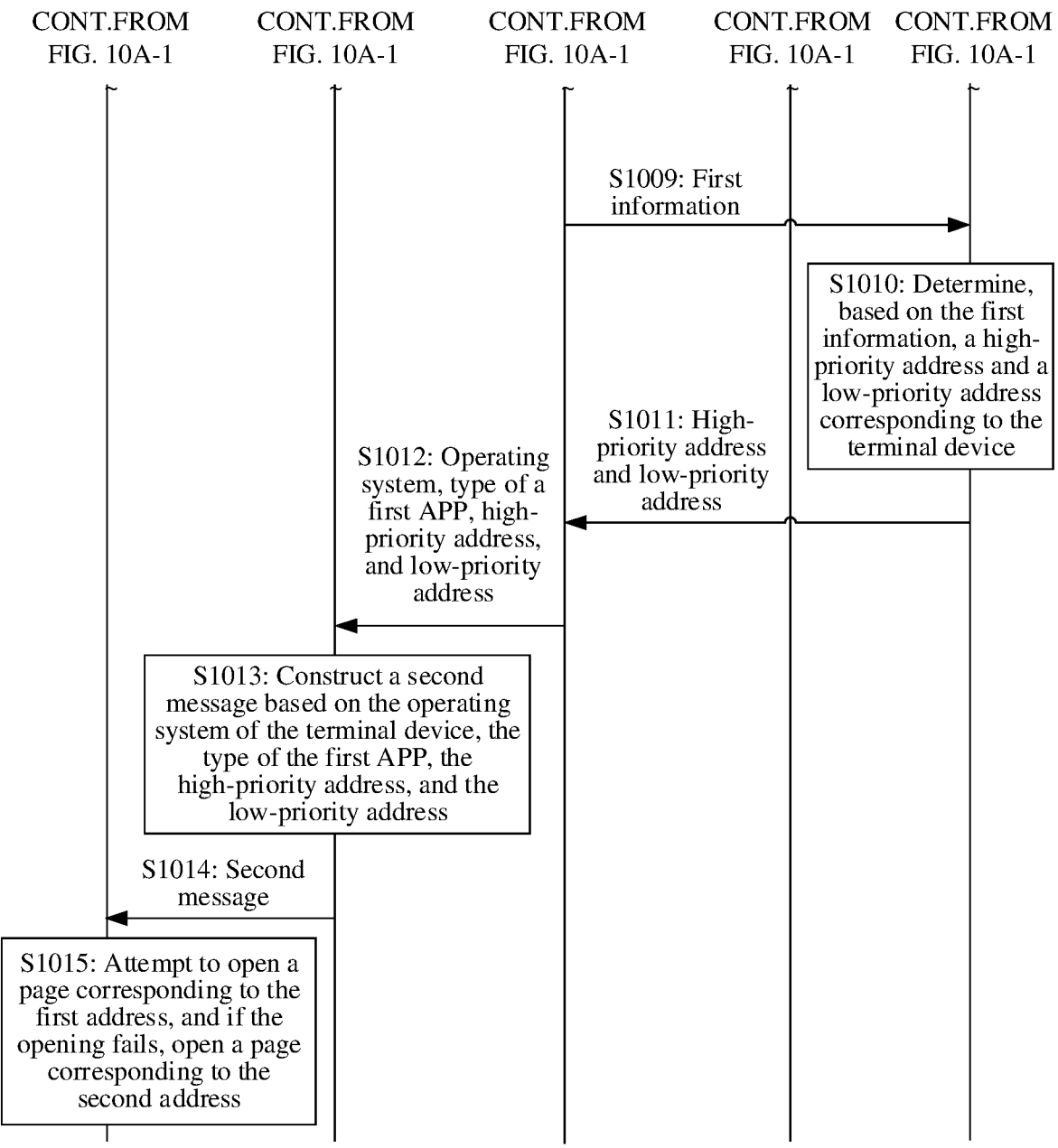

Corresponding to the system shown in FIG. 2, FIG. 10A-1 and FIG. 10A-2 are a schematic flowchart of an embodiment according to embodiments of this application. FIG. 10A-1 and FIG. 10A-2 show an interaction process between modules when the developer configures both the default policy and the advanced policy. The interaction process specifically includes the following steps.

S1001: A first APP on the terminal device sends a first message to the policy matching module, where the first message carries an IP address of the terminal device and a UA.

In a possible implementation, to promote the target APP, the developer may encode a third address of the server to generate a two-dimensional code. When needing to download the target APP, a user may scan the two-dimensional code by using the first APP installed on the terminal device. The first APP may parse the two-dimensional code to obtain the third address, and send the first message to the server based on the third address, where the first message carries the IP address of the terminal device and the UA. The UA carries operating system information and model information of the terminal device and information of the first APP.

It should be noted that the two-dimensional code in this embodiment of this application is merely an example, and another identification code such as a bar code may also be generated. In this embodiment of this application, the two-dimensional code is used as an example to describe solutions of embodiments of this application.

It should be noted that the first APP may be any software module or hardware module having a code scanning function on the terminal device, or a combination of software and hardware. The first APP is not limited in embodiments of this application.

S1002: The policy matching module sends the IP address of the terminal device to the auxiliary library management module.

S1003: The auxiliary library management module searches, based on the IP address of the terminal device, the IP mapping library for the country/region corresponding to the terminal device.

An example is described below.

Table 4 is an example of the IP mapping library. Assuming that the IP address of the terminal device is IP3, it may be found from Table 4 that the country/region corresponding to the terminal device is USA region.

TABLE 4

| IP Address | Country/region |
|---|---|
| IP1 | Beijing, China |
| IP2 | Shanghai, China |
| IP3 | Shenzhen, China |
| IP3 | USA region |
| ... | ... |

S1004: The auxiliary library management module returns the country/region corresponding to the terminal device to the policy matching module.

S1005: The policy matching module determines the operating system and the model of the terminal device based on the UA.

In a possible implementation, the policy matching module parses the UA to obtain the operating system information and the model information of the terminal device and the information of the first APP, determines the operating system of the terminal device based on the operating system information, determines the model of the terminal device based on the model information, and determines a type of the first APP based on the information of the first APP.

When a same terminal device scans a two-dimensional code by using a same APP, UAs in first messages sent by the APP to the server are the same. To avoid repeated parsing of the same UA, after obtaining a mapping relationship between the UA, the operating system, the model, and the type of the first APP through parsing, the policy matching module may cache the mapping relationship. After receiving a first message next time, the policy matching module first searches the cached mapping relationship for the operating system and the model corresponding to the UA carried in the first message. If the operating system and the model are found, in S1006, the policy matching module sends the found operating system and model to the auxiliary library management module. If the operating system and the model are not found, the policy matching module parses the UA carried in the first message, and in S1006, the policy matching module sends the obtained operating system and model to the auxiliary library management module.

S1006: The policy matching module sends the operating system and the model of the terminal device to the auxiliary library management module.

S1007: The auxiliary library management module searches, based on the operating system and the model of the terminal device, the model library for the brand of the terminal device.

An example is described below.

Table 5 is an example of the model library. Assuming that the operating system of the terminal device is an Android system and the model is TAS-AL00, it may be found from Table 5 that the brand of the terminal device is Huawei.

TABLE 5

| Model data 1 | Android system, Huawei, TAS-AL00 |
| Model data 1 | Android system, Huawei, ELE-AL00 |
| Model data 1 | iOS system, Apple, A2223 |
| ... | ... |

S1008: The auxiliary library management module returns the brand of the terminal device to the policy matching module.

It should be noted that S1002 to S1004 are a process of obtaining the country/region corresponding to the terminal device by the policy matching module, and S1005 to S1008 are a process of obtaining the brand of the terminal device by the policy matching module. The two processes may be performed simultaneously, or may be performed in a chronological order. The chronological order in which the two processes are performed is not limited in embodiments of this application.

It should be noted that S1002 to S1004 are a process of obtaining the country/region corresponding to the terminal device, and S1006 to S1008 are a process of obtaining the brand of the terminal device. Whether to perform S1002 to S1004 and S1006 to S1008 may be determined based on the conditions in the advanced policy. For example, when the conditions in the advanced policy include operating system, brand, model, and country, S1002 to S1004 and S1006 to S1008 need to be performed. When the conditions in the advanced policy include operating system, brand, and model, S1002 to S1004 do not need to be performed, and only S1006 to S1008 need to be performed. When the conditions in the advanced policy include operating system, model, and country/region, S1006 to S1008 do not need to be performed, and only S1002 to S1004 need to be performed. When the conditions in the advanced policy include operating system and model, neither S1002 to S1004 nor S1006 to S1008 needs to be performed. A person skilled in the art may adapt steps to be performed to the conditions in the advanced policy, and all solutions obtained based on this shall fall within the protection scope of embodiments of this application.

At least one of the country/region corresponding to the terminal device and the operating system, the model, or the brand of the terminal device is referred to as first information in embodiments of this application.

S1009: The policy matching module sends the first information to the policy management module.

S1010: The policy management module determines, based on the first information, a high-priority address and a low-priority address corresponding to the terminal device.

In a possible implementation, the policy management module searches, based on the first information, the advanced policy for the high-priority address and the low-priority address corresponding to the terminal device. If the high-priority address and the low-priority address are found, the policy management module returns the found high-priority address and low-priority address to the policy execution module. If the high-priority address and the low-priority address are not found, the policy management module searches the default policy for the high-priority address and the low-priority address corresponding to the terminal device.

Examples are described below.

Example 1

It is assumed that the advanced policy is shown in Table 3, the operating system of the terminal device is an Android system, the brand is Huawei, and the country/region corresponding to the terminal device is USA region. Through search in Table 3, the address of the download page of the target APP in AppGallery in Table 3 may be used as the high-priority address corresponding to the terminal device, and the address of the download page of the target APP in Google Play in Table 3 may be used as the low-priority address corresponding to the terminal device.

Example 2

It is assumed that the advanced policy is shown in Table 3, the default policy is shown in Table 2, the operating system of the terminal device is an Android system, the model is ANA-AN00, the brand is Huawei, and the country/region corresponding to the terminal device is USA region. The corresponding high-priority address and low-priority address cannot be found in Table 3. In this case, through search in Table 2, the address of the download page of the target APP in AppGallery in Table 2 may be used as the high-priority address corresponding to the terminal device, and the address of the download page of the target APP in Google Play in Table 2 may be used as the low-priority address corresponding to the terminal device.

S1011: The policy management module returns the high-priority address and the low-priority address to the policy matching module.

S1012: The policy matching module sends the operating system of the terminal device, the type of the first APP, the high-priority address, and the low-priority address to the policy execution module.

S1013: The policy execution module constructs a second message based on the operating system of the terminal device, the type of the first APP, the high-priority address, and the low-priority address, where the second message includes the high-priority address and the low-priority address sent by the policy matching module.

In a possible implementation, whether the first APP is a restricted APP is determined based on the type of the first APP. The restricted APP includes, for example, WeChat. If the first APP is a restricted APP, a third message corresponding to a guide page is constructed, and the third message is sent to the first APP. If the first APP is not a restricted APP, the second message is constructed based on the operating system of the terminal device and a set to which the type of the first APP belongs. Specifically, the second message may be constructed in the following manner. If the operating system of the terminal device is a first preset system, the type of the first APP belongs to a first set, and the low-priority address is a hypertext transfer protocol http address, the second message conforming to an Intent syntax is constructed, where the first set includes an APP that supports the intent syntax, such as Chrome browser or Huawei browser. If the operating system of the terminal device is a first preset system, the type of the first APP belongs to the first set, and the second address corresponding to the terminal device is not an http address, the second message of JAVASCRIPT is constructed. If the operating system of the terminal device is a first preset system, and the type of the first APP belongs to a second set, the second message of JAVASCRIPT is constructed, where the second set includes an APP that supports JAVASCRIPT, such as Firefox browser or UC browser. If the operating system of the terminal device is a second preset system, and the type of the first APP belongs to a third set, the second message of JAVASCRIPT is constructed, where the third set includes an APP that supports JAVASCRIPT, such as safari browser.

In another possible implementation, referring to FIG. 1i, the policy execution module determines an operating system of the terminal device. If the operating system of the terminal device is a first preset system, and the first preset system includes but is not limited to an Android system, the policy execution module continues to determine whether the first APP is a restricted APP, and if the first APP is a restricted APP, constructs a third message corresponding to a guide page, and sends the third message to the first APP. If the first APP is not a restricted APP, the type of the first APP belongs to a first set, and the type of the low-priority address is a hypertext transfer protocol http address, the policy execution module constructs the second message conforming to an Intent syntax, where the second message conforming to the Intent syntax includes a high-priority address and a low-priority address sent by the policy matching module. If the first APP is not a restricted APP, the type of the first APP belongs to the first set, and the type of the low-priority address is not an http address, the policy execution module constructs the second message of JAVASCRIPT. If the first APP is not a restricted APP, and the type of the first APP belongs to a second set, the policy execution module constructs the second message of the JAVASCRIPT, where the second message of the JAVASCRIPT includes a high-priority address and a low-priority address sent by the policy matching module. The first set includes but is not limited to Chrome browser or Huawei browser, and the second set includes but is not limited to Firefox browser or UC browser.

If the operating system of the terminal device is a second preset system, and the second preset system includes but is not limited to an iPhone operation system (iPhone Operation System, iOS) developed by Apple, the policy execution module continues to determine whether the first APP is a restricted APP, and if the first APP is a restricted APP, constructs a third message corresponding to a guide page, and sends the third message to the first APP. If the first APP is not a restricted APP, and the type of the first APP belongs to a third set, the policy execution module constructs the second message of JAVASCRIPT, where the third set includes but is not limited to safari browser.

In a possible implementation, the second message of the guide page may be:

```
<!DOCTYPE html>
<html>
  <head>
  </head>
  <body>
    <img src="guide page icon"/>
  </body>
</html>
```

The guide page icon may be placed with an arrow that guides a user to open with a browser.

In a possible implementation, the second message conforming to the Intent syntax may be:

intent://$Path of the high-priority address #Intent; scheme=$scheme of the high-priority address; package=package name of the application store corresponding to the high-priority address; S.browser fallback url=$low-priority address; end The following describes Path of the high-priority address and scheme of the high-priority address through an example.

It is assumed that the high-priority address is appmarket://details?id=com.xxx, Path of the high-priority address is details?id=com.xxx, and scheme of the high-priority address is appmarket.

In a possible implementation, the second message of JAVASCRIPT may be:

```
window.top.location = "$high priority address";
setTimeout(function timeout( ) {
  if (isHidden( )) {
    return;
  }
  window.top.location = "$low priority address";
}, time)
```

S1014: The policy execution module returns the second message to the first APP on the terminal device.

S1015: The first APP on the terminal device attempts to open a page corresponding to the first address, and if the opening fails, opens a page corresponding to the second address.

When the second message returned by the policy execution module is the second message of the guide page, the first APP opens the guide page.

An example is described below.

Figure 12:
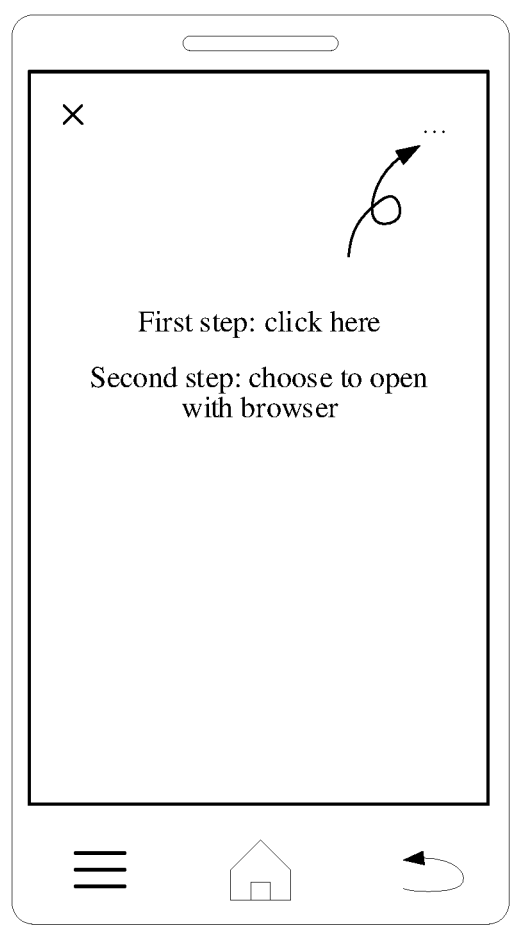
FIG. 12 is a schematic diagram of a guide page according to an embodiment of this application.

It is assumed that the operating system of the terminal device is an Android system, the brand is Huawei, the model is TAS-AL00, the country/region is USA region, and an application store installed on the terminal device is AppGallery. After a user scans a two-dimensional code by using WeChat on the terminal device, it may be determined through Slow to S1010 that the high-priority address is the address of the download page of the target APP in AppGallery, and the low-priority address is the address of the download page of the target APP in Google Play. In S1013, if determining that WeChat is a restricted APP, the policy execution module generates a second message of a guide page. After receiving the second message, the first APP opens the guide page shown in FIG. 12.

When the second message returned by the policy execution module is the second message conforming to the Intent syntax, the first APP extracts, from the package field of the second message, the package name of the application store corresponding to the high-priority address, and determines, based on the package name, whether the terminal device has installed the application store corresponding to the high-priority address. If the terminal device has installed the application store corresponding to the high-priority address, the first APP opens the application store corresponding to the high-priority address, and sends Path of the high-priority address and scheme of the high-priority address to the application store. The application store opens the download page of the target APP in the application store based on the received Path and scheme. If the terminal device has not installed the application store corresponding to the high-priority address, the terminal device opens a page corresponding to a value of browser fallback url, that is, a page corresponding to the low-priority address, where a type of the low-priority address is a hypertext transfer protocol http address.

Examples are described below.

Example 1

Figure 13:
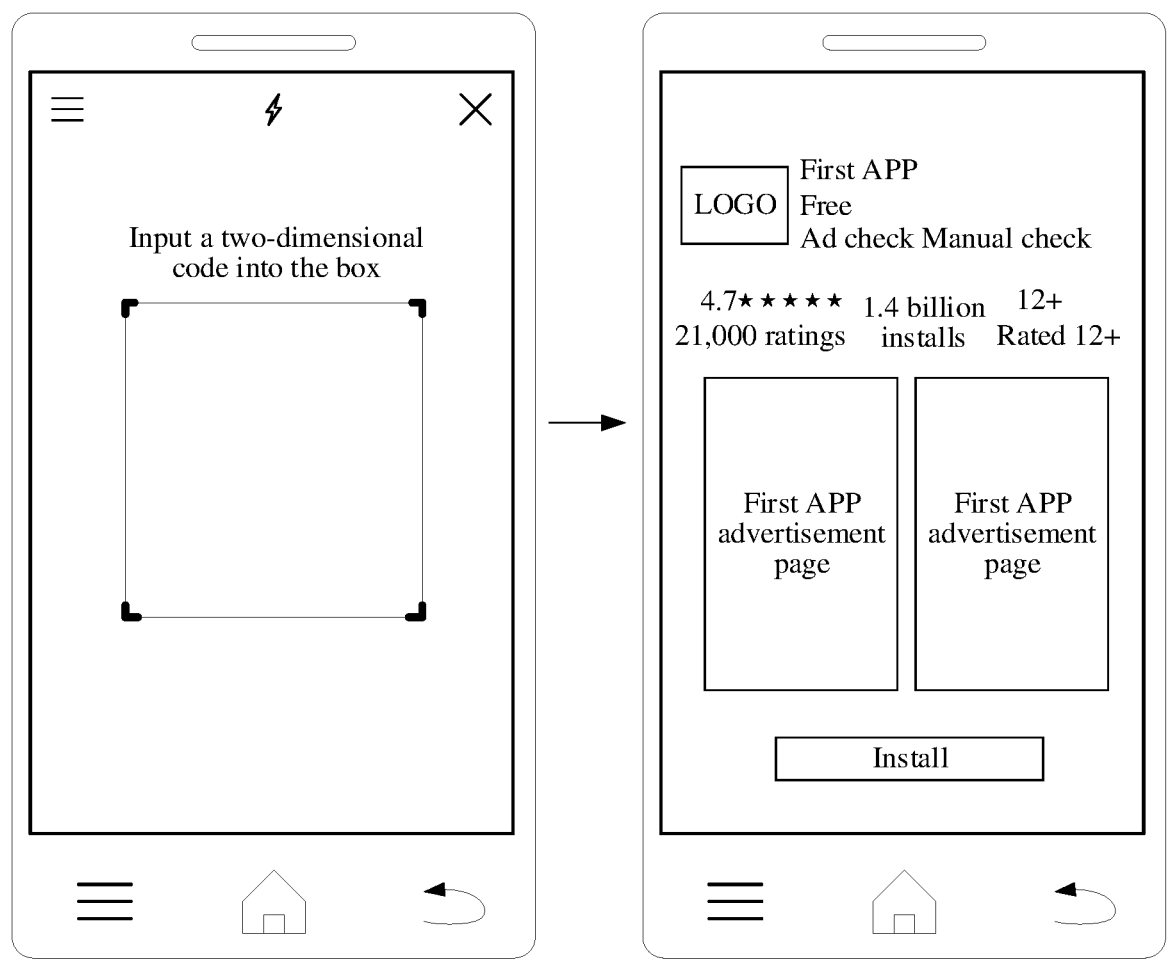
FIG. 13 is a first schematic diagram of a user interface according to an embodiment of this application.

It is assumed that the operating system of the terminal device is an Android system, the brand is Huawei, the model is TAS-AL00, the country/region is USA region, and the application store installed on the terminal device is AppGallery. After a user scans a two-dimensional code by using Huawei browser installed on the terminal device, it is assumed that as determined through Slow-Slow, the high-priority address is the address of the download page of the target APP in AppGallery, the low-priority address is the address of the download page of the target APP in Google Play, and the type of the low-priority address is a hypertext transfer protocol http address. Because the operating system of the terminal device is an Android system, and the first APP used by the terminal device is Huawei browser, the policy execution module constructs the second message conforming to the Intent syntax in S1013. After receiving the second message conforming to the Intent syntax, the first APP on the terminal device extracts, from the package field of the second message, the package name of the application store corresponding to the high-priority address. After determining, based on the package name, that the terminal device has installed AppGallery, the first APP opens AppGallery, and sends Path and scheme of the high-priority address to AppGallery. AppGallery opens the download page of the target APP in AppGallery based on the received Path and scheme, as shown in FIG. 13.

Example 2

Figure 14:
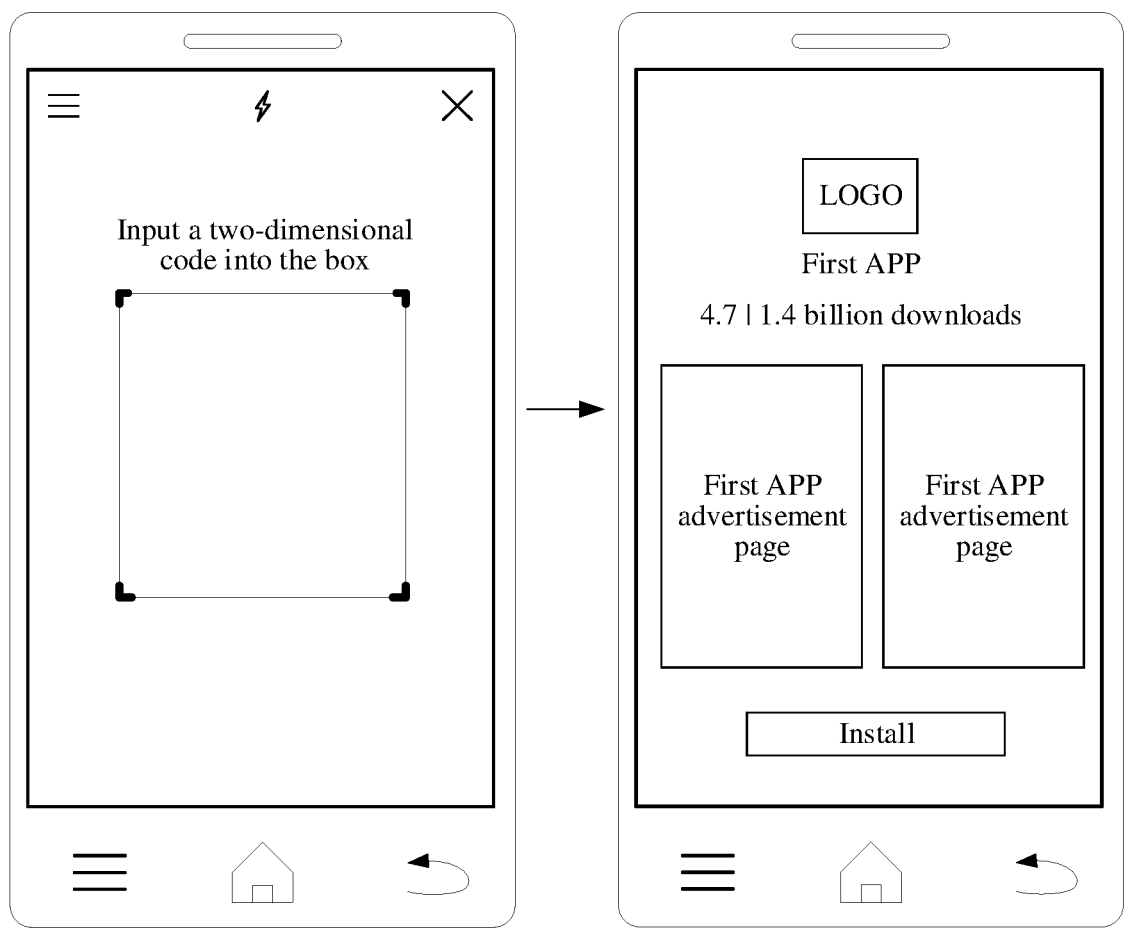
FIG. 14 is a second schematic diagram of a user interface according to an embodiment of this application.
Figure 15:
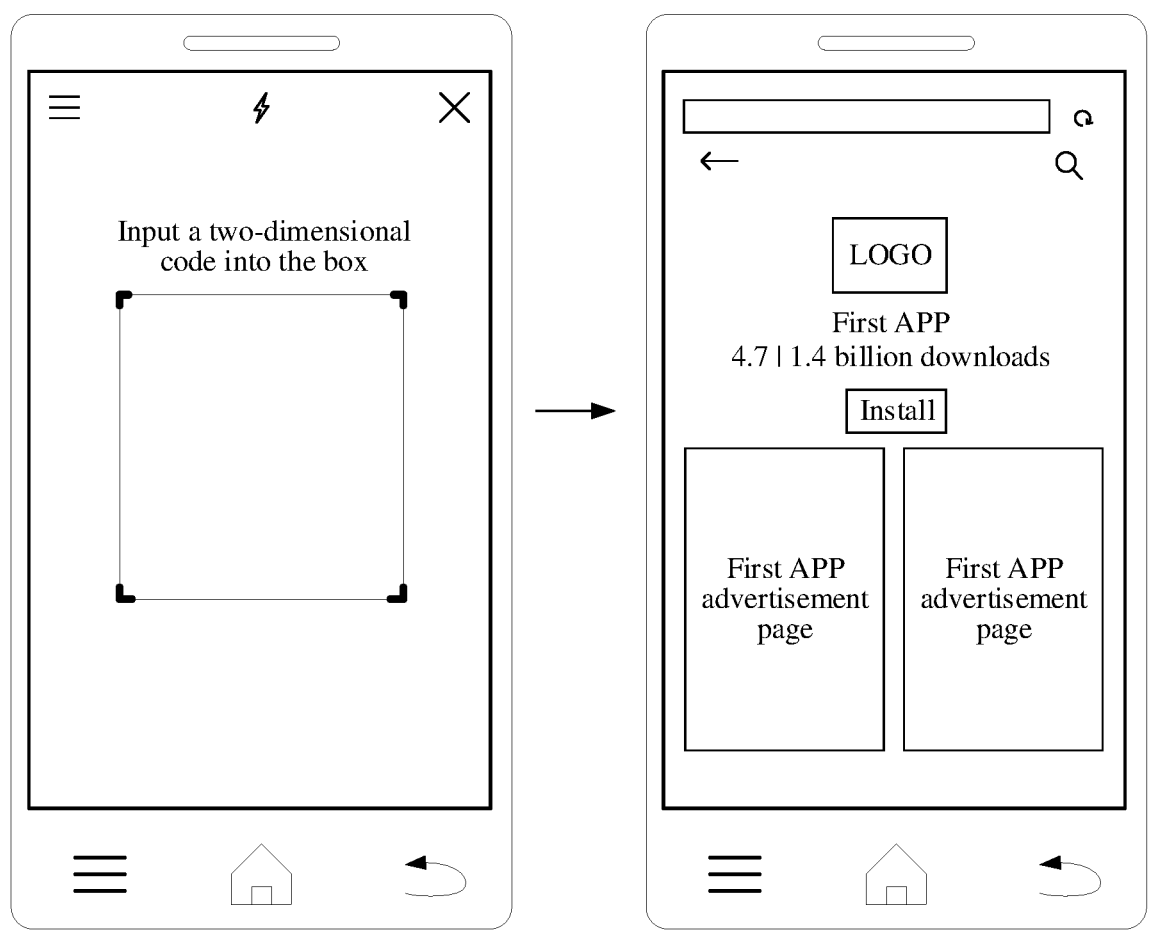
FIG. 15 is a third schematic diagram of a user interface according to an embodiment of this application.

It is assumed that the operating system of the terminal device is an Android system, the brand is Huawei, the model is TAS-AL00, the country/region is USA region, and the application store installed on the terminal device is Google Play. After a user scans a two-dimensional code by using Huawei browser installed on the terminal device, it is assumed that as determined through Slow-Slow, the high-priority address is the address of the download page of the target APP in AppGallery, the low-priority address is the address of the download page of the target APP in Google Play, and the type of the low-priority address is a hypertext transfer protocol http address. Because the operating system of the terminal device is an Android system, and the first APP used by the terminal device is Huawei browser, the policy execution module constructs the second message conforming to the Intent syntax in S1013. After receiving the second message conforming to the Intent syntax, the first APP on the terminal device extracts, from the package field of the second message, the package name of the application store corresponding to the high-priority address. After determining, based on the package name, that the terminal device has not installed AppGallery, the first APP opens the page corresponding to the low-priority address, as shown in FIG. 14. If the low-priority address cannot be opened, the first APP opens a page corresponding to the low-priority address in World Wide Web (World Wide Web, web), as shown in FIG. 15.

When the second message returned by the policy execution module is the second message of JAVASCRIPT, the first APP first attempts to open the page corresponding to the high-priority address by deep linking. If a display interface of the terminal device does not change within a preset time period, the first APP opens the page corresponding to the low-priority address by deep linking.

Examples are described below.

Example 1

It is assumed that the operating system of the terminal device is an Android system, the brand is Huawei, the model is TAS-AL00, the country/region is USA region, and the application store installed on the terminal device is AppGallery. After a user scans a two-dimensional code by using UC browser installed on the terminal device, it is assumed that as determined through Slow-Slow, the high-priority address is the address of the download page of the target APP in AppGallery, and the low-priority address is the address of the download page of the target APP in Google Play. Because the operating system of the terminal device is an Android system, and the first APP used by the terminal device is UC browser, the policy execution module constructs the second message of JAVASCRIPT in S1013. After receiving the second message of JAVASCRIPT, the first APP on the terminal device first attempts to open the page corresponding to the high-priority address by deep linking. Because the terminal device has installed AppGallery, the page corresponding to the high-priority address, that is, the download page of the target APP in AppGallery, can be opened. The download page of the target APP in AppGallery is shown in FIG. 13.

Example 2

It is assumed that the operating system of the terminal device is an Android system, the brand is Huawei, the model is TAS-AL00, the country/region is USA region, and the application store installed on the terminal device is Google Play. After a user scans a two-dimensional code by using UC browser installed on the terminal device, it is assumed that as determined through Slow-Slow, the high-priority address is the address of the download page of the target APP in AppGallery, and the low-priority address is the address of the download page of the target APP in Google Play. Because the operating system of the terminal device is an Android system, and the first APP used by the terminal device is UC browser, the policy execution module constructs the second message of JAVASCRIPT in S1013. After receiving the second message of JAVASCRIPT, the first APP on the terminal device first attempts to open the page corresponding to the high-priority address by deep linking. Because the terminal device has not installed AppGallery, a display interface of the terminal device does not change within a preset time period. In this case, the first APP attempts to open the page corresponding to the low-priority address by deep linking. Because the terminal device has installed Google Play, the page corresponding to the low-priority address, that is, the download page of the target APP in Google Play, can be opened. The download page of the target APP in Google Play is shown in FIG. 14.

It should be noted that in S1012, the operating system of the terminal device and the type of the first APP that are sent by the policy matching module to the policy execution module are not necessary. Sending the two pieces of information by the policy matching module is to enable the policy execution module to construct a more matched second message based on the two pieces of information, thereby improving a possibility that the first APP opens a download page. In some embodiments, the policy matching module may not send the operating system of the terminal device and the type of the first APP to the policy execution module, and instead, sends only the high-priority address and the low-priority address. After receiving the priority address and the low-priority address, the policy execution module constructs any type of second message that includes the two addresses, for example, a second message conforming to an Intent syntax or a second message of JAVASCRIPT. For the examples of the second message conforming to the Intent syntax and the second message of JAVASCRIPT, refer to the foregoing description. Details are not described herein again in embodiments of this application.

According to the method for obtaining an address of a download page provided in this embodiment, when configuring a default policy and an advanced policy, a developer may configure two addresses, so that a terminal device can receive the two addresses after scanning a two-dimensional code. The terminal device first attempts to open a page corresponding to a high-priority address, and if the opening fails, opens a page corresponding to a low-priority address. Compared with a manner of configuring only one address, this method improves a success rate of opening a download page of a target APP by the terminal device. In addition, the design of the advanced policy enables the developer to perform more refined configuration. Because a terminal device of a specific operating system, brand, model, and/or country/region supports installation of a small number of types of application stores, the developer may configure, by using the advanced policy, an address of a download page of the target APP in an application store that is most likely to be installed on the terminal device as the high-priority address, thereby further improving the success rate of opening the download page of the target APP by the terminal device. In addition, a server constructs different second messages based on a type of an APP used by the terminal device to scan the two-dimensional code, thereby further improving the success rate of opening the download page of the target APP by the terminal device.

Figure 10B:
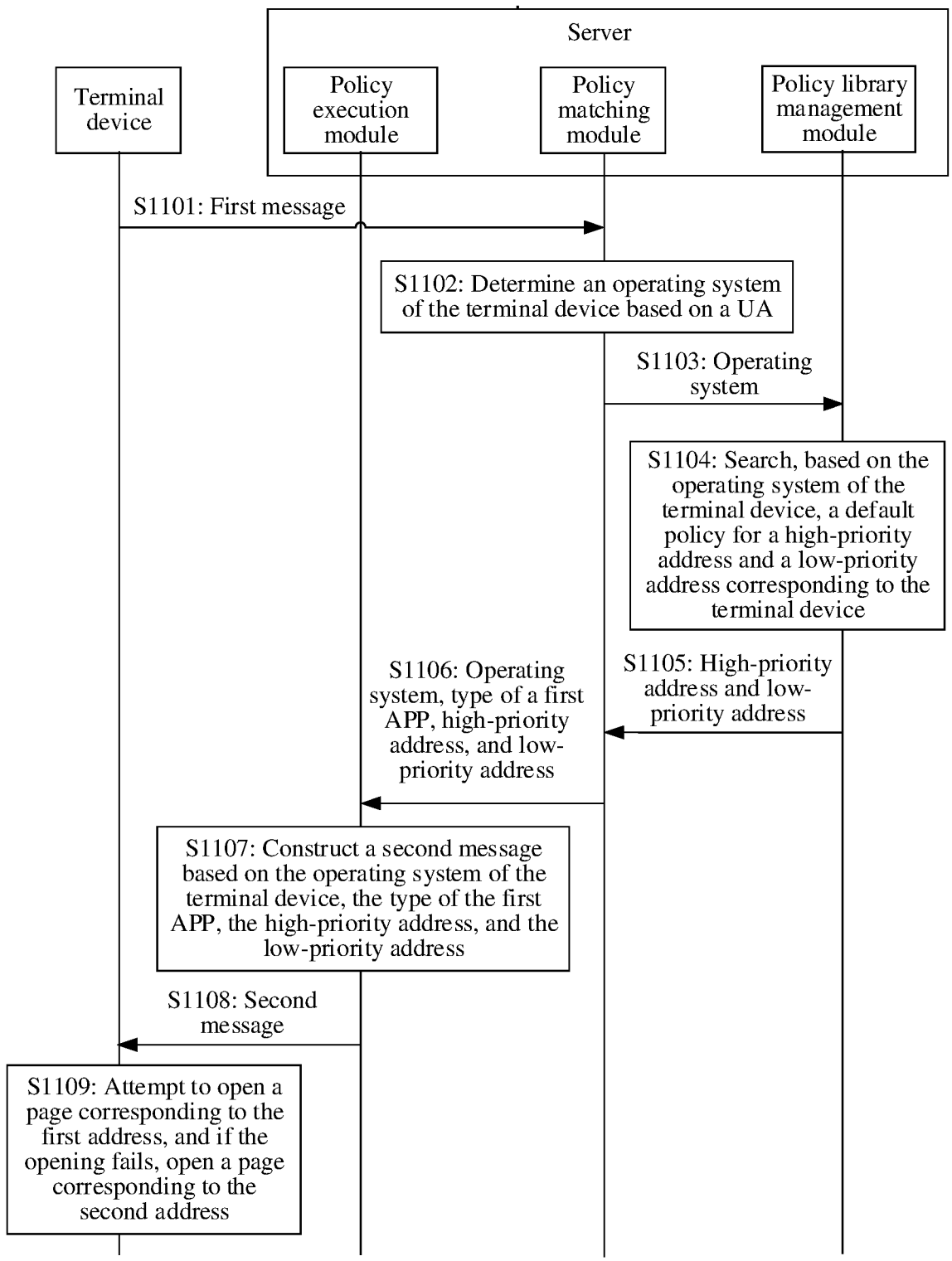
FIG. 10B is a schematic flowchart of another embodiment according to embodiments of this application.

FIG. 10B is a schematic flowchart of another embodiment according to embodiments of this application. FIG. 10B shows an interaction process between modules when the developer configures only the default policy. The interaction process specifically includes the following steps.

S1101: A first APP on the terminal device sends a first message to the policy matching module, where the first message carries a UA.

In a possible implementation, to promote the target APP, the developer may encode a third address of the server to generate a two-dimensional code. When needing to download the target APP, a user may scan the two-dimensional code by using the first APP installed on the terminal device. The first APP may parse the two-dimensional code to obtain the third address, and send the first message to the server based on the third address, where the first message carries the UA.

S1102: The policy matching module determines the operating system of the terminal device based on the UA.

For an implementation process of this step, refer to S1005 in the foregoing embodiment. Details are not described again in embodiments of this application.

S1103: The policy matching module sends the operating system of the terminal device to the policy management module.

S1104: The policy management module searches, based on the operating system of the terminal device, the default policy for the high-priority address and the low-priority address corresponding to the terminal device.

An example is described below.

It is assumed that the default policy is shown in Table 2, and the operating system of the terminal device is an Android system. Through search in Table 2, the address of the download page of the target APP in AppGallery in Table 2 may be used as the high-priority address corresponding to the terminal device, and the address of the download page of the target APP in Google Play in Table 2 may be used as the low-priority address corresponding to the terminal device.

S1105: The policy management module returns the high-priority address and the low-priority address to the policy matching module.

S1106: The policy matching module sends the operating system of the terminal device, the type of the first APP, the high-priority address, and the low-priority address to the policy execution module.

S1107: The policy execution module constructs a second message based on the operating system of the terminal device, the type of the first APP, the high-priority address, and the low-priority address.

S1108: The policy execution module returns the second message to the first APP on the terminal device.

S1109: The first APP on the terminal device attempts to open a page corresponding to the first address, and if the opening fails, opens a page corresponding to the second address.

For an implementation process of S1106 to S1109, refer to S1012 to S1015 in the foregoing embodiment. Details are not described again in embodiments of this application.

According to the method for obtaining an address of a download page provided in this embodiment, the developer may configure a default policy by using the console. In the default policy, different operating systems may each include at least two addresses, and priorities of the at least two addresses are different. After the terminal device scans the two-dimensional code, the server may match the operating system of the terminal device with the default policy to obtain the high-priority address and the low-priority address corresponding to the operating system of the terminal device, and send the two addresses to the terminal device.

The terminal device first attempts to open a page corresponding to the high-priority address. If the opening fails, the terminal device opens a page corresponding to the low-priority address. Compared with a manner of configuring only one address, this method improves a success rate of opening the download page of the target APP by the terminal device.

Figures 1, 10C:
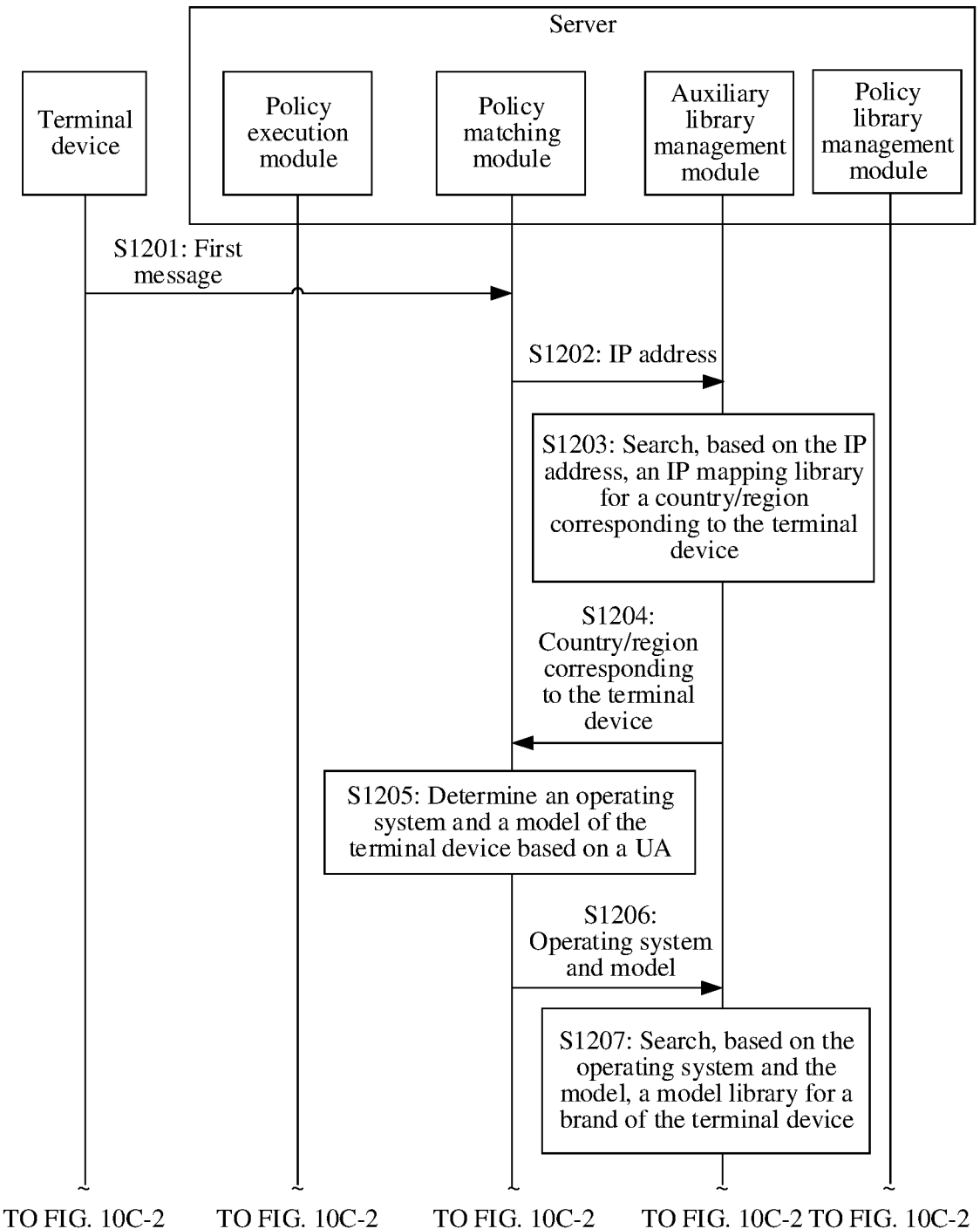
Figures 2, 10C:
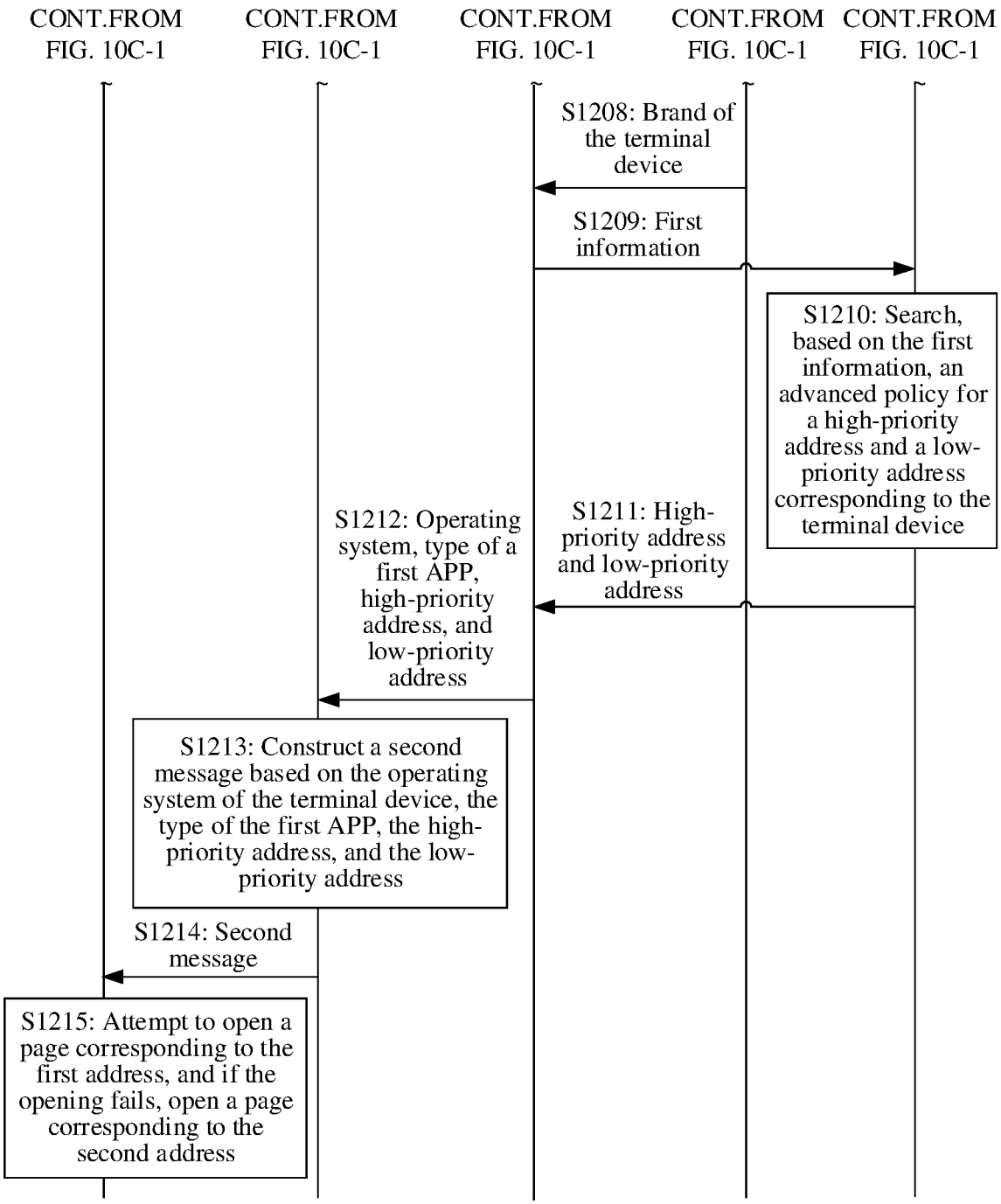
Figure 11:
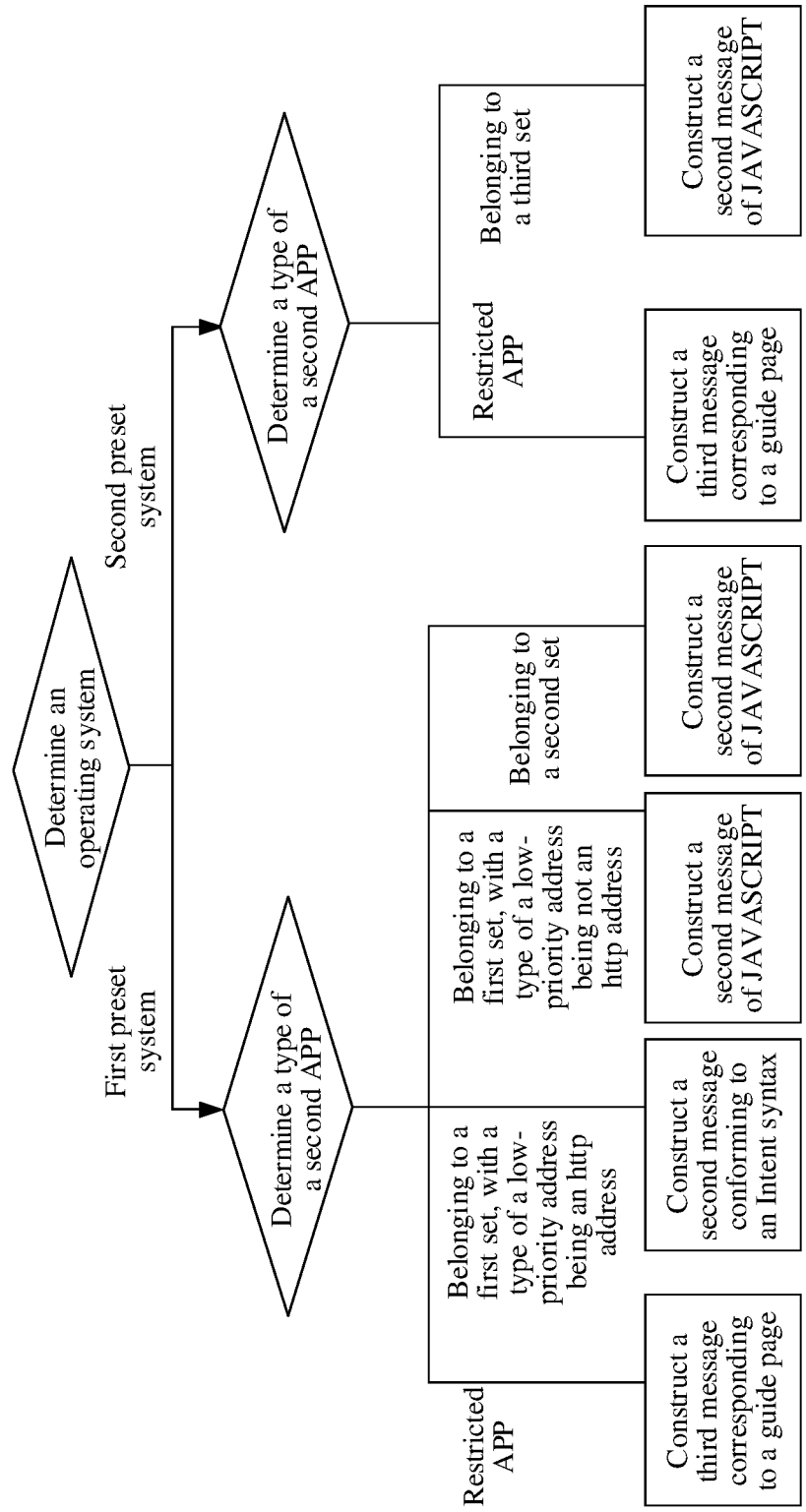
FIG. 11 is a schematic flowchart of constructing a second message according to an embodiment of this application.

FIG. 10C-1 and FIG. 10C-2 are a schematic flowchart of another embodiment according to embodiments of this application. FIG. 10C-1 and FIG. 10C-2 show an interaction process between modules when the developer configures only the advanced policy. The interaction process specifically includes the following steps.

S1201: A first APP on the terminal device sends a first message to the policy matching module, where the first message carries an IP address of the terminal device and a UA.

S1202: The policy matching module sends the IP address of the terminal device to the auxiliary library management module.

S1203: The auxiliary library management module searches, based on the IP address of the terminal device, the IP mapping library for the country/region corresponding to the terminal device.

S1204: The auxiliary library management module returns the country/region corresponding to the terminal device to the policy matching module.

S1205: The policy matching module determines the operating system and the model of the terminal device based on the UA.

S1206: The policy matching module sends the operating system and the model of the terminal device to the auxiliary library management module.

S1207: The auxiliary library management module searches, based on the operating system and the model of the terminal device, the model library for the brand of the terminal device.

S1208: The auxiliary library management module returns the brand of the terminal device to the policy matching module.

S1209: The policy matching module sends the first information to the policy management module.

For S1201 to S1209, refer to S1ow to S1009 in the foregoing embodiment. Details are not described again in embodiments of this application.

S1210: The policy management module searches, based on the first information, the advanced policy for the high-priority address and the low-priority address corresponding to the terminal device.

An example is described below.

It is assumed that the advanced policy is shown in Table 4, the operating system of the terminal device is an Android system, the brand is Huawei, and the country/region corresponding to the terminal device is USA region. Through search in Table 3, the address of the download page of the target APP in AppGallery in Table 3 may be used as the high-priority address corresponding to the terminal device, and the address of the download page of the target APP in Google Play in Table 3 may be used as the low-priority address corresponding to the terminal device.

S1211: The policy management module returns the high-priority address and the low-priority address to the policy matching module.

S1212: The policy matching module sends the operating system of the terminal device, the type of the first APP, the high-priority address, and the low-priority address to the policy execution module.

S1213: The policy execution module constructs a second message based on the operating system of the terminal device, the type of the first APP, the high-priority address, and the low-priority address.

S1214: The policy execution module returns the second message to the first APP on the terminal device.

S1215: The first APP on the terminal device attempts to open a page corresponding to the first address, and if the opening fails, opens a page corresponding to the second address.

For an implementation process of S1212 to S1215, refer to S1012 to S1015 in the foregoing embodiment. Details are not described again in embodiments of this application.

According to the method for obtaining an address of a download page provided in this embodiment, after a terminal device scans a two-dimensional code, a server may match an operating system, a brand, a model, and/or a country/region of the terminal device with an advanced policy to obtain a corresponding high-priority address and low-priority address, and send the two addresses to the terminal device. The terminal device first attempts to open a page corresponding to the high-priority address. If the opening fails, the terminal device opens a page corresponding to the low-priority address. Compared with a manner of configuring only one address, this method improves a success rate of opening the download page of the target APP by the terminal device. In addition, because a terminal device of a specific operating system, brand, model, and/or country/region supports installation of a small number of types of application stores, the developer may configure, by using the advanced policy, an address of a download page of the target APP in an application store that is most likely to be installed on the terminal device as the high-priority address, thereby further improving the success rate of opening the download page of the target APP by the terminal device.

Figure 16:
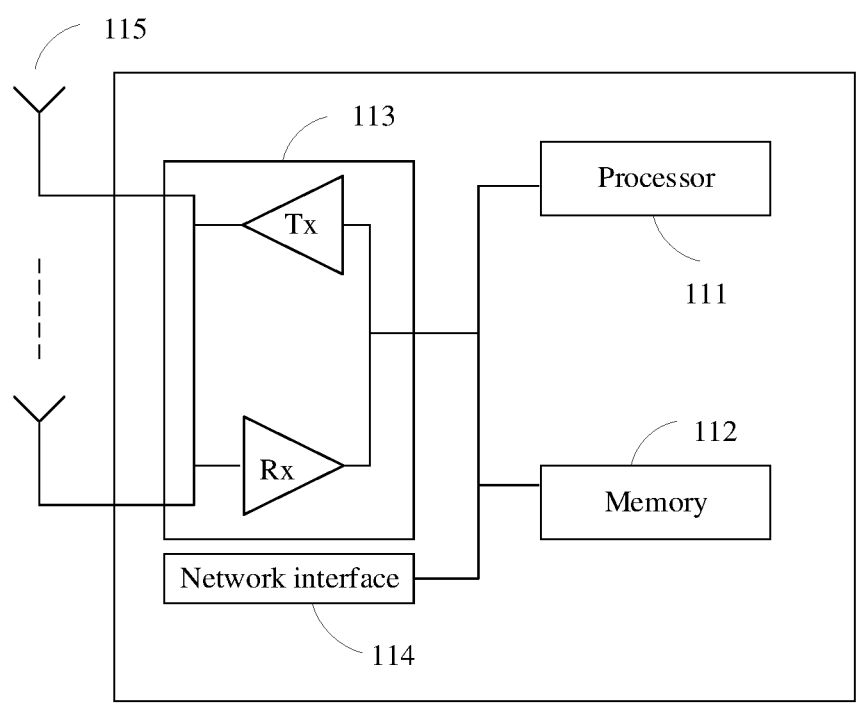
FIG. 16 is a schematic diagram of a structure of an electronic device 160 according to an embodiment of this application.

FIG. 16 is a schematic diagram of a structure of an electronic device 160. The electronic device may be the server described above. The electronic device 160 includes at least one processor 111, at least one memory 112, at least one transceiver 113, at least one network interface 114, and one or more antennas 115. The processor in, the memory 112, the transceiver 113, and the network interface 114 are connected, for example, by a bus. In this application, the connection may include various interfaces, transmission lines, buses, or the like. This is not limited in this application. The antenna 115 is connected to the transceiver 113. The network interface 114 is configured to enable an access network device to connect to another communication device through a communication link.

The processor 111 is mainly configured to process a communication protocol and communication data, execute a software program, and process data of the software program. The processor 111 in FIG. 16 may integrate functions of a baseband processor and a central processing unit. A person skilled in the art may understand that the baseband processor and the central processing unit may alternatively be separate processors that are interconnected by a bus or other technologies. A person skilled in the art may understand that the baseband processor may also be referred to as a baseband processing circuit or a baseband processing chip. The central processing unit may also be referred to as a central processing circuit or a central processing chip. A function of processing the communication protocol and the communication data may be built in the processor, or may be stored in the memory in a form of a software program, and the processor executes the software program to implement a baseband processing function.

The memory is mainly configured to store the software program and the data. The memory 112 may be independent, and connected to the processor 111. Optionally, the memory 112 and the processor 111 may be integrated together, for example, integrated in a chip. The memory 112 can store program code for executing technical solutions of embodiments of this application, and execution of the program code is controlled by the processor 111. Various computer program code executed may also be considered as a driver of the processor 111.

FIG. 16 shows only one memory and one processor. The electronic device 160 may include a plurality of processors and a plurality of memories. The memory may also be referred to as a storage medium, a storage device, or the like. The memory may be a storage element located on a same chip as the processor, that is, an on-chip storage element, or may be an independent storage element. This is not limited in embodiments of this application.

The transceiver 113 may be configured to support receiving or sending of a radio frequency signal between the electronic device and a terminal device, and the transceiver 113 may be connected to the antenna 115. The transceiver 113 includes a transmitter Tx and a receiver Rx. Specifically, the one or more antennas 115 may receive a radio frequency signal. The receiver Rx of the transceiver 113 is configured to receive the radio frequency signal from the antenna, convert the radio frequency signal into a digital baseband signal or a digital intermediate frequency signal, and provide the digital baseband signal or the digital intermediate frequency signal to the processor 111, so that the processor 1111 further processes, for example, demodulates or decodes, the digital baseband signal or the digital intermediate frequency signal. In addition, the transmitter Tx of the transceiver 1113 is further configured to receive a modulated digital baseband signal or digital intermediate frequency signal from the processor 1111, converts the modulated digital baseband signal or digital intermediate frequency signal into a radio frequency signal, and sends the radio frequency signal via the one or more antennas 1115. Specifically, the receiver Rx may selectively perform one-stage or multi-stage down-mixing and analog-to-digital conversion on the radio frequency signal to obtain a digital baseband signal or a digital intermediate frequency signal. An order in which the down-mixing and the analog-to-digital conversion are performed is adjustable. The transmitter Tx may selectively perform one-stage or multi-stage up-mixing and digital-to-analog conversion on a modulated digital baseband signal or digital intermediate frequency signal to obtain a radio frequency signal. An order in which the up-mixing and the digital-to-analog conversion are performed is adjustable. The digital baseband signal and the digital intermediate frequency signal may be collectively referred to as a digital signal.

The transceiver may also be referred to as a transceiver unit, a transmitter-receiver, a transceiver apparatus, or the like. Optionally, a component configured to implement a receiving function in the transceiver unit may be considered as a receiving unit, and a component configured to implement a sending function in the transceiver unit may be considered as a sending unit. In other words, the transceiver unit includes a receiving unit and a sending unit. The receiving unit may also be referred to as a receiver, an input port, a receiving circuit, or the like. The sending unit may be referred to as a transmitter, a transmitter machine, a transmitter circuit, or the like.

Figure 17:
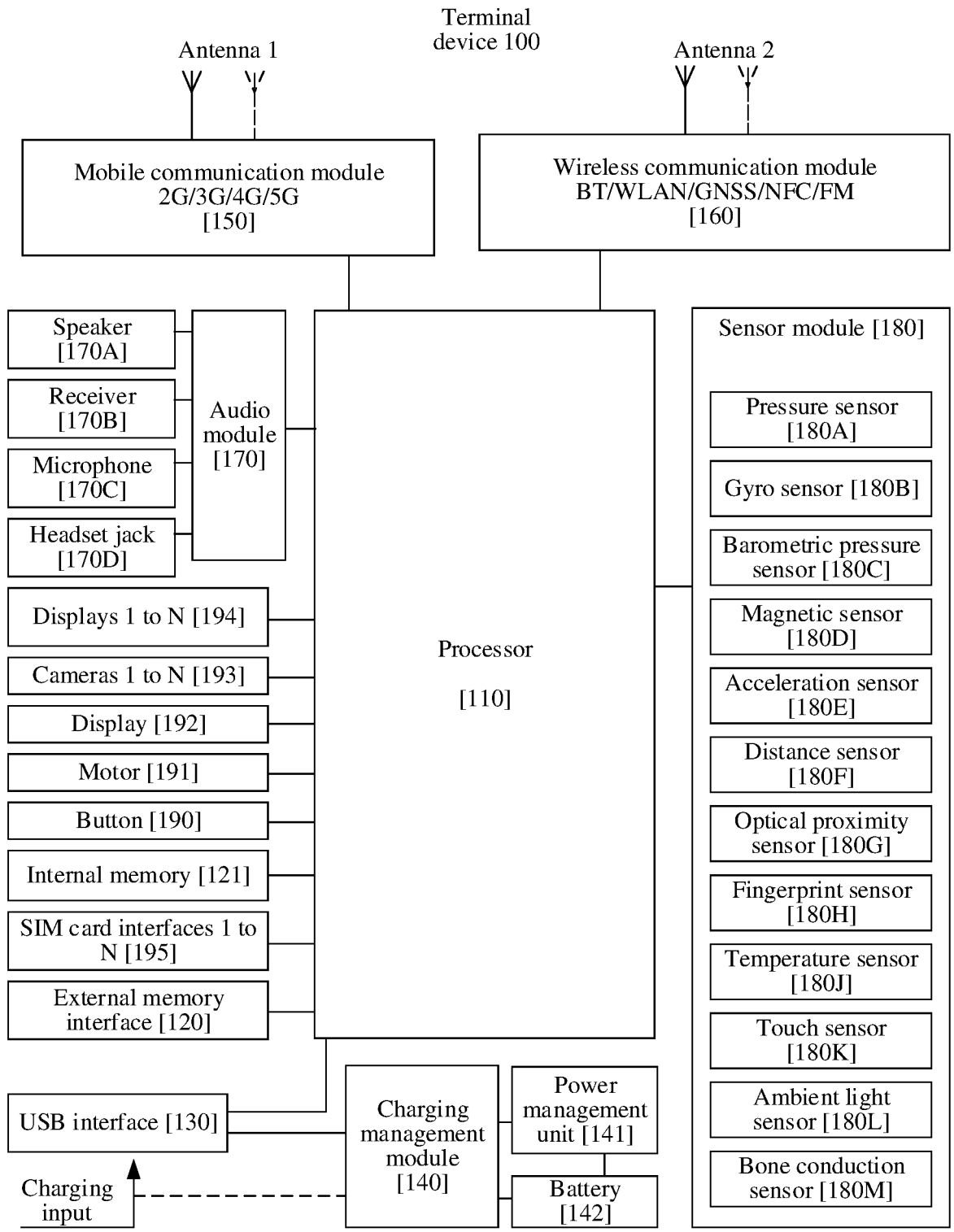
FIG. 17 is a schematic diagram of a structure of a terminal device 100 according to an embodiment of this application.

FIG. 17 is a schematic diagram of a structure of a terminal device 100. The terminal device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, etc. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, etc.

It may be understood that the structure shown in this embodiment of the present invention does not constitute a specific limitation on the terminal device 100. In some other embodiments of this application, the terminal device 100 may include more or fewer components than those shown in the figure, or some components may be combined, or some components may be divided, or different component arrangements may be used. The illustrated components may be implemented by hardware, software, or a combination of software and hardware.

The processor no may include one or more processing units. For example, the processor no may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU), etc. Different processing units may be separate components, or may be integrated into one or more processors.

The controller may generate an operation control signal based on an instruction operation code and a timing signal, and implement control on instruction fetching and instruction execution.

A memory configured to store instructions and data may be further disposed in the processor no. In some embodiments, the memory in the processor no is a cache. The memory may store an instruction or data that is recently used or to be cyclically used by the processor no. When needing to use the instruction or the data again, the processor no may directly call the instruction or the data from the memory. This avoids repeated accessing and reduces a wait time for the processor no, thereby improving system efficiency.

The antenna 1 and the antenna 2 are configured to transmit and receive electromagnetic wave signals. Each antenna in the terminal device 100 may be configured to cover one or more communication frequency bands. Different antennas may also be reused to improve antenna utilization. For example, the antenna 1 may be reused as a diversity antenna of a wireless local area network. In some other embodiments, the antenna may be used in combination with a tuning switch.

The mobile communication module 150 may provide a solution applied to the terminal device 100 for wireless communication including 2G/3G/4G/5G and the like. The mobile communication module 150 may include at least one filter, a switch, a power amplifier, a low noise amplifier (low noise amplifier, LNA), and the like. The mobile communication module 150 may receive an electromagnetic wave via the antenna 1, perform processing such as filtering and amplification on the received electromagnetic wave, and transmit the electromagnetic wave to the modem processor for demodulation. The mobile communication module 150 may further amplify a signal modulated by the modem processor. The amplified signal is converted into an electromagnetic wave and radiated out via the antenna 1. In some embodiments, at least some functional modules of the mobile communication module 150 may be disposed in the processor no. In some embodiments, at least some functional modules of the mobile communication module 150 and at least some modules of the processor no may be disposed in a same component.

The wireless communication module 160 may provide a solution applied to the terminal device 100 for wireless communication including a wireless local area network (wireless local area network, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more components integrating at least one communications processor module. The wireless communication module 160 receives an electromagnetic wave via the antenna 2, performs frequency modulation and filtering on the electromagnetic wave signal, and sends the processed signal to the processor no. The wireless communication module 160 may further receive a to-be-sent signal from the processor no, and perform frequency modulation and amplification on the signal. The amplified signal is converted into an electromagnetic wave and radiated out via the antenna 2.

In some embodiments, in the terminal device 100, the antenna 1 is coupled to the mobile communication module 150, and the antenna 2 is coupled to the wireless communication module 160, so that the terminal device 100 can communicate with a network and another device through a wireless communication technology.

Figure 18:
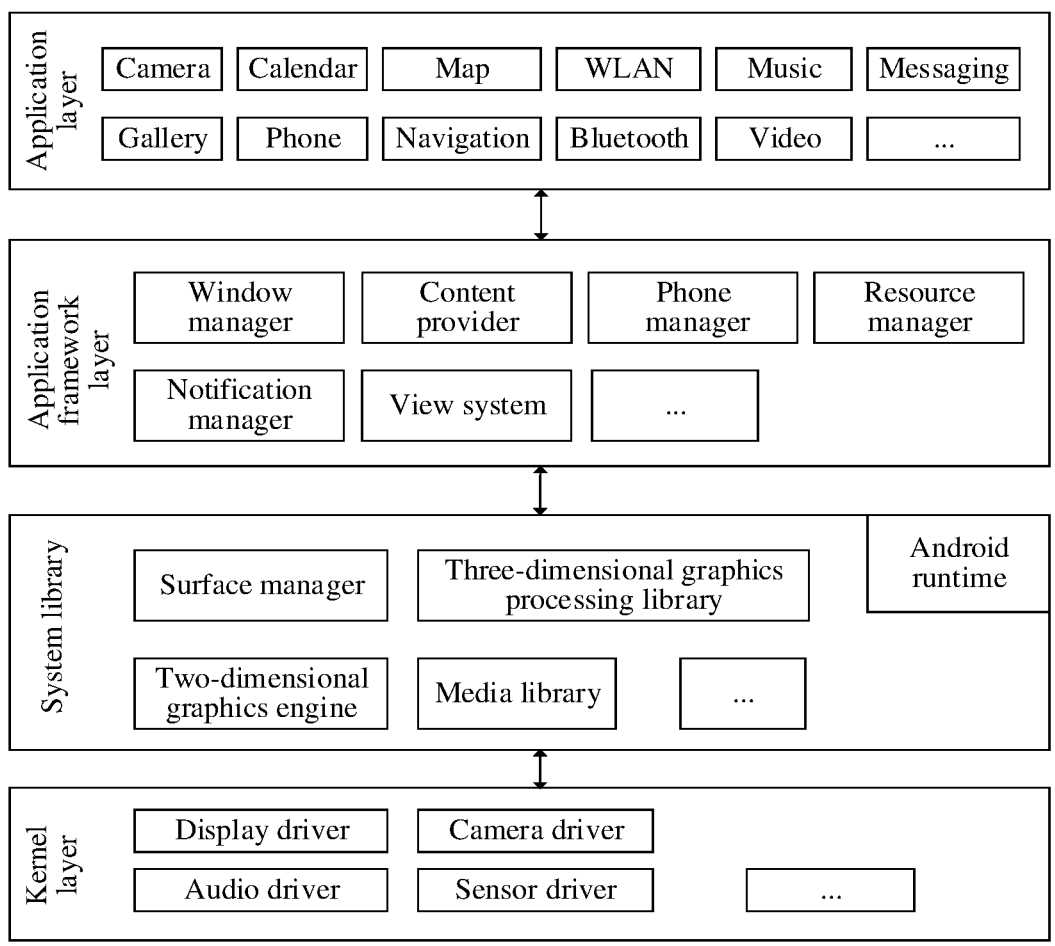
FIG. 18 is a block diagram of a software structure of a terminal device 100 according to an embodiment of this application.

FIG. 18 is a block diagram of a software structure of a terminal device 100 according to an embodiment of the present invention.

A layered architecture divides software into several layers, with each layer having a clear role and responsibilities. The layers communicate with each other through software interfaces. In some embodiments, an Android system is divided into four layers from top to bottom: an application layer; an application framework layer; an Android runtime (Android runtime) and a system library; and a kernel layer.

The application layer may include a series of application packages.

As shown in FIG. 18, the application packages may include applications, such as Camera, Gallery, Calendar, Phone, Map, Navigation, WLAN, Bluetooth, Music, Video, and Messaging, and the application packages may further include a first APP.

The application framework layer provides an application programming interface (application programming interface, API) and a programming framework for the applications in the application layer. The application framework layer includes some predefined functions.

As shown in FIG. 18, the application framework layer may include a window manager, a content provider, a view system, a phone manager, a resource manager, a notification manager, and the like.

The window manager is configured to manage a windowing program. The window manager may obtain a size of a display screen, determine whether there is a status bar, perform screen locking, perform screen capturing, and so on.

The content provider is configured to store and retrieve data and make the data accessible to an application. The data may include a video, an image, audio, phone calls made and answered, a browsing history, favorites, a phone book, etc.

The view system includes a visual control, for example, a control for displaying text or a control for displaying a picture. The view system may be configured to build an application. A display interface may include one or more views. For example, a display interface including an SMS notification icon may include a view for displaying text and a view for displaying a picture.

The phone manager is configured to provide a communication function for the terminal device 100. For example, the communication function includes call status management (including call connection, hang-up, and the like).

The resource manager provides a variety of resources, such as localized character strings, icons, pictures, layout files, video files, and so on, for applications.

The notification manager enables an application to display a notification message in a status bar. The notification messages may be used to convey an informative message that may disappear automatically after a short period of time, and no user interaction is required. For example, the notification manager is used for informing completion of downloading, for message alerts, and so on. The notification manager may also provide, on a status bar at the top of the system, a notification in a form of a chart or scroll bar text, for example, a notification of an application running in the background, or provide, on a screen, a notification in a form of a dialog window. For example, text information is displayed in the status bar, a prompt tone is generated, an electronic device vibrates, and an indicator light blinks.

The Android Runtime includes a kernel library and a virtual machine. The Android runtime is responsible for scheduling and managing an Android system.

The kernel library includes two parts: one part being functional functions that java needs to call, and the other part being an Android kernel library.

The application layer and the application framework layer run in the virtual machine. The virtual machine executes java files of the application layer and the application framework layer as binary files. The virtual machine is configured to perform functions, such as object life cycle management, stack management, thread management, security and exception management, and garbage collection.

The system library may include a plurality of functional modules. For example, the functional modules include a surface manager (surface manager), a media library (Media Library), a three-dimensional graphics processing library (for example, OpenGL ES), a 2D graphics engine (for example, SGL), and the like.

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, such as MPEG4, H.264, MP3, AAC, AMR, JPG, and PNG.

The three-dimensional graphics processing library is configured to implement three-dimensional drawing, image rendering, compositing, and layer processing.

The 2D graphics engine is a drawing engine for 2D drawing.

The kernel layer is a layer between hardware and software. The kernel layer includes at least a display driver, a camera driver, an audio driver, and a sensor driver.

An embodiment of this application further provides a communication system, including the electronic device 160 shown in FIG. 16 and the terminal device 100 shown in FIG. 17.

An embodiment of this application further provides a readable storage medium. The readable storage medium stores a computer program. When the computer program is executed, the steps on the server side or the steps on the terminal device side in the foregoing embodiments may be implemented.

An embodiment of this application further provides a computer program product. When instructions included in the computer program product are run on a computer, the computer is enabled to perform the steps on the server side or the steps on the terminal device side in the foregoing embodiments.

The foregoing descriptions are merely specific implementations of embodiments of this application, and are not intended to limit the protection scope of embodiments of this application. Any variation or replacement that a person skilled in the art can easily figure out within the technical scope disclosed in embodiments of this application shall fall within the protection scope of embodiments of this application. Therefore, the protection scope of embodiments of this application should be subject to the protection scope of the claims.

What is claimed is:

1. A terminal device, comprising:
a processor; and
a non-transitory computer-readable storage medium storing a program to be executed by the processor, the program including instructions for:
receiving a first message sent by a first application (APP) on a terminal device, wherein the first message comprises a user agent (UA);
determining, based on the first message, a first address and a second address corresponding to the terminal device; and
sending a second message to the first APP, wherein the second message comprises the first address and the second address, and wherein the first APP attempts to open a page corresponding to the first address, based on the second message, after receiving the second message, and based on the opening failing, opening a page corresponding to the second address.

2. The terminal device according to claim 1, wherein the instructions for determining, based on the first message, the first address and the second address corresponding to the terminal device comprise instructions for:
parsing the UA to obtain an operating system of the terminal device; and
searching, based on the operating system, a first policy for the first address and the second address corresponding to the terminal device, wherein the first policy comprises first addresses and second addresses corresponding to different operating systems.

3. The terminal device according to claim 2, wherein the first policy comprises a first address and a second address corresponding to an Android system, the first address corresponding to the Android system is an address of a download page in an overseas version of a Huawei application store (AppGallery), and the second address corresponding to the Android system is an address of a download page in Google application store (Google Play).

4. The terminal device according to claim 3, wherein the instructions for searching, based on the operating system, a first policy for the first address and the second address corresponding to the terminal device comprise instructions for:
using, based on the operating system being the Android system, the address of the download page in AppGallery in the first policy as the first address corresponding to the terminal device, and the address of the download page in Google Play in the first policy as the second address corresponding to the terminal device.

5. The terminal device according to claim 1, wherein the first message further comprises an internet protocol (IP) address of the terminal device, and the instructions for determining, based on the first message, the first address and the second address corresponding to the terminal device comprise instructions for:
determining first information of the terminal device based on the UA and the IP address, wherein the first information comprises at least one of an operating system, a model, a brand, or a country/region;
searching, based on the first information, a second policy for the first address and the second address corresponding to the terminal device, wherein the second policy comprises first addresses and second addresses corresponding to at least one of different operating systems, brands, models, or countries/regions; and
searching, based on the first address and the second address corresponding to the terminal device not being found in the second policy, and based on the operating system, a first policy for the first address and the second address corresponding to the terminal device, wherein the first policy comprises first addresses and second addresses corresponding to different operating systems.

6. The terminal device according to claim 5, wherein the instructions for determining first information of the terminal device based on the UA and the IP address comprise instructions for:
searching, based on the UA, a cached mapping relationship for an operating system and a model corresponding to the UA;
determining, based on the operating system and the model corresponding to the UA being found, the first information based on the IP address and the found operating system and model;
parsing, based on the operating system and the model corresponding to the UA not being found, the UA to obtain an operating system and a model of the terminal device; and
determining the first information based on the IP address, the operating system, and the model.

7. The terminal device according to claim 5, wherein the second policy comprises a first address and a second address corresponding to an Android system, Huawei brand, and a non-China region, wherein the first address corresponding to the Android system, Huawei brand, and the non-China region is an address of a download page in an overseas version of Huawei application store (AppGallery), and the second address corresponding to the Android system, Huawei brand, and the non-China region is an address of a download page in Google application store (Google Play).

8. The terminal device according to claim 7, wherein the instructions for searching, based on the first information, the second policy for the first address and the second address corresponding to the terminal device comprises:

using, based on the operating system of the terminal device being the Android system, the brand of the terminal device being Huawei, and the country/region of the terminal device being a non-China region, the address of the download page in AppGallery in the second policy as the first address corresponding to the terminal device, and the address of the download page in Google Play in the second policy as the second address corresponding to the terminal device.

9. The terminal device according to claim 1, wherein the instructions further include instructions for, before the sending the second message to the first APP, the:
  parsing the UA to obtain an operating system of the terminal device and a type of the first APP; and
  constructing the second message based on the operating system of the terminal device and the type of the first APP.

10. The terminal device according to claim 9, wherein the instructions for constructing the second message based on the operating system of the terminal device and the type of the first APP comprise instructions for:
  constructing, based on the operating system of the terminal device being an Android system, the type of the first APP belonging to a first set, and the second address corresponding to the terminal device being a hypertext transfer protocol http address, the second message conforming to an intent syntax, wherein the first set comprises an APP that supports the intent syntax; or
  constructing, based on the operating system of the terminal device being an Android system, the type of the first APP belonging to the first set, and the second address corresponding to the terminal device not being an http address, the second message of JAVASCRIPT; or
  constructing, based on the operating system of the terminal device being an Android system, and the type of the first APP belonging to a second set, the second message of JAVASCRIPT, wherein the second set comprises an APP that supports JAVASCRIPT.

11. The terminal device according to claim 9, wherein the instructions for constructing the second message based on the operating system of the terminal device and the type of the first APP comprise instructions for:
  constructing, based on the operating system of the terminal device being an iPhone operation system (iOS), and the type of the first APP belonging to a third set, the second message of JAVASCRIPT, wherein the third set comprises an APP that supports JAVASCRIPT.

12. An address obtaining method, comprising:
  scanning an identification code to obtain a third address;
  sending a first message to an electronic device corresponding to the third address, wherein the first message comprises a user agent (UA);
  receiving a second message sent by the electronic device, wherein the second message comprises a first address and a second address corresponding to a terminal device, and the first address and the second address are determined by the electronic device based on the first message; and
  attempting to open a page corresponding to the first address, and based on the opening failing, opening a page corresponding to the second address.

13. The method according to claim 12, wherein the identification code is a two-dimensional code.

14. The method according to claim 12, wherein:
  the first address and the second address are found in a first policy by the electronic device based on an operating system of the terminal device, after parsing the UA to obtain the operating system; and
  the first policy comprises first addresses and second addresses corresponding to different operating systems.

15. The method according to claim 12, wherein:
  the first message further comprises an internet protocol (IP) address of the terminal device, and wherein the first address and the second address are found in a second policy by the electronic device, based on first information of the terminal device, after determining the first information based on the UA and the IP address;
  the second policy comprises first addresses and second addresses corresponding to at least one of different operating systems, brands, models, or countries/regions; and
  the first information comprises at least one of an operating system, a model, a brand, or a country/region.

16. The method according to claim 12, wherein:
  the first message further comprises an internet protocol (IP) address of the terminal device, and wherein the first address and the second address are found in a first policy by the electronic device, based on failing to find the first address and the second address in a second policy based on first information of the terminal device, after determining the first information based on the UA and the IP address;
  the second policy comprises first addresses and second addresses corresponding to at least one of different operating systems, brands, models, or countries/regions;
  the first policy comprises first addresses and second addresses corresponding to different operating systems; and
  the first information comprises at least one of an operating system, a model, a brand, or a country/region.

17. An address obtaining method, comprising:
  receiving a first message sent by a first application (APP) on a terminal device, wherein the first message comprises a user agent (UA);
  determining, based on the first message, a first address and a second address corresponding to the terminal device; and
  sending a second message to the first APP, wherein the second message comprises the first address and the second address, and wherein the first APP attempts to open a page corresponding to the first address, based on the second message, after receiving the second message, and based on the opening failing, opening a page corresponding to the second address.

18. The method according to claim 17, wherein determining, based on the first message, the first address and the second address corresponding to the terminal device comprises:
  parsing the UA to obtain an operating system of the terminal device; and
  searching, based on the operating system, a first policy for the first address and the second address corresponding to the terminal device, wherein the first policy comprises first addresses and second addresses corresponding to different operating systems.

19. The method according to claim 17, wherein the first message further comprises an internet protocol (IP) address of the terminal device, and wherein determining, based on the first message, the first address and the second address corresponding to the terminal device comprises:

determining first information of the terminal device based on the UA and the IP address, wherein the first information comprises at least one of an operating system, a model, a brand, or a country/region;

searching, based on the first information, a second policy for the first address and the second address corresponding to the terminal device, wherein the second policy comprises first addresses and second addresses corresponding to at least one of different operating systems, brands, models, or countries/regions; and searching, based on the first address and the second address corresponding to the terminal device not being found in the second policy, and based on the operating system, a first policy for the first address and the second address corresponding to the terminal device, wherein the first policy comprises first addresses and second addresses corresponding to different operating systems.

20. The method according to claim 17, wherein the method further comprises, before the sending the second message to the first APP:

parsing the UA to obtain an operating system of the terminal device and a type of the first APP; and constructing the second message based on the operating system of the terminal device and the type of the first APP.

* * * * *